United States Patent
Ryan

(10) Patent No.: US 7,613,642 B2
(45) Date of Patent: Nov. 3, 2009

(54) EQUITY BASED INCENTIVE COMPENSATION PLAN COMPUTER SYSTEM

(75) Inventor: Raymond B. Ryan, Darien, CT (US)

(73) Assignee: Equity Based Incentive Compensation, LLC, Darien, CT (US)

( * ) Notice: Subject to any disclaimer, the term of this patent is extended or adjusted under 35 U.S.C. 154(b) by 398 days.

(21) Appl. No.: 10/816,014

(22) Filed: Apr. 1, 2004

(65) Prior Publication Data

US 2005/0137967 A1 Jun. 23, 2005

Related U.S. Application Data

(60) Provisional application No. 60/459,718, filed on Apr. 1, 2003.

(51) Int. Cl.
*G06Q 30/00* (2006.01)

(52) U.S. Cl. .................. 705/35; 705/1; 705/36 R; 705/38

(58) Field of Classification Search ............ 705/35, 705/36 R, 38, 1
See application file for complete search history.

(56) References Cited

U.S. PATENT DOCUMENTS

| | | | | |
|---|---|---|---|---|
| 4,750,121 A | 6/1988 | Halley et al. | ............... | 364/408 |
| 4,953,085 A | 8/1990 | Atkins | ............... | 364/408 |
| 4,969,094 A | 11/1990 | Halley et al. | ............... | 364/408 |
| 5,025,138 A | 6/1991 | Cuervo | ............... | 235/379 |
| 5,429,506 A | 7/1995 | Brophy et al. | ............... | 434/107 |
| 5,590,037 A | 12/1996 | Ryan et al. | ............... | 395/204 |
| 5,797,133 A | 8/1998 | Jones et al. | ............... | 705/38 |
| 5,802,500 A | 9/1998 | Ryan et al. | ............... | 705/36 |
| 5,875,437 A | 2/1999 | Atkins | ............... | 705/40 |
| 5,878,405 A * | 3/1999 | Grant et al. | ............... | 705/39 |
| 5,907,828 A | 5/1999 | Meyer et al. | ............... | 705/4 |
| 5,911,135 A | 6/1999 | Atkins | ............... | 705/36 |
| 5,911,136 A | 6/1999 | Atkins | ............... | 705/36 |
| 5,926,800 A | 7/1999 | Baronowski et al. | ............... | 705/35 |
| 5,930,776 A | 7/1999 | Dykstra et al. | ............... | 705/38 |
| 5,999,917 A | 12/1999 | Facciani et al. | ............... | 705/36 |
| 6,304,859 B1 | 10/2001 | Ryan et al. | ............... | 705/38 |
| 6,473,737 B2 | 10/2002 | Burke | ............... | 705/4 |
| 7,047,217 B1 | 5/2006 | Gottstein | ............... | 705/36 |
| 7,398,245 B1 * | 7/2008 | Bent et al. | ............... | 705/38 |
| 2002/0194136 A1 | 12/2002 | Sullivan et al. | ............... | 705/64 |

(Continued)

OTHER PUBLICATIONS http://web.archive.org/web/20001013072611/trowprice.com/brokerage/index.html (T. Rowe Price website), Oct. 13, 2000, pp. 1-7.*

(Continued)

*Primary Examiner*—Mary D. Cheung
*Assistant Examiner*—Shahid R Merchant
(74) *Attorney, Agent, or Firm*—Peter K. Trzyna

(57) ABSTRACT

A system and process linking an external computer with a system of a lending institution, a market information vendor or brokerage company, to provide for simultaneous tracking of one or more investments by a Plan to ensure each Plan's investment provides adequate collateral for the lender. Further, the system provides access to Plan component values via electronic means to the various parties of interest; the Plan participant, the Plan administrator, the Plan lender, and the Plan sponsor. Finally, the system creates forecasts of a Plan using assumptions to enable a reader of the illustration to understand the employee participant and employer sponsor benefits and costs of the program.

51 Claims, 26 Drawing Sheets

U.S. PATENT DOCUMENTS

2003/0018557 A1* 1/2003 Gilbert et al. ............... 705/36
2005/0131798 A1 6/2005 Eisler et al. ................ 705/37

OTHER PUBLICATIONS

Ford Motor Company, 2001 Annual Report, Mar. 14, 2002, pp. 1-5, 46-72.*
Ford Motor Company, Form 11-K, Jun. 18, 2002.*
The Electronic Investor: Marginal Costs by Theresa W. Carey, Barron's, Oct. 16, 2000, vol. 80, Iss 42, p. 50.*
India: Borrowing Money to Pay for Stocks, Businessline, Sep. 23, 2001, p. 1.*
Mutual Funds and 401K—An Agreeable Combination by Lauren Rudd, Savannah Morning News, May 22, 2000, p. 9A.*
Margin Calls, Sellouts Anger Some Investors by Christine Dugas, USA Today, Apr. 11, 2001, p. B3.*
Pearson PLC, Form 20-F, Jun. 10, 2002, pp. F-20 to F-24.*
http://web.archive.org/web/20010131095700/prudential.com/businesscenter/bczzz1009.html (Prudential website), Jan. 31, 2001, pp. 1-3.*
http://web.archive.org/web/20011216032658/www400.fidelity.com (Fidelity website), Dec. 16, 2001, pp. 1-3.*
http://web.archive.org/web/20011113215801/wps.fidelity.com/taxexempt/employer/956945589826/971289937731.htm (Fidelity website), Nov. 13, 2001, pp. 1-2.*
Compliance Guide for Small Entities, The Federal Reserve Board, www.federalreserve.gov/regulations/cg/regucg.htm, Sep. 27, 2002.*
Operating Pension Funds in Compliance with ERISA Procedures: How to avoid Department of labor audit: A primer for lawyers by Stanley L. lezman, Journal of Pension Plan Investing, Fall 1996.*
PCT International Search Report for PCT/US06/016510, filed Apr. 28, 2006. pp. 1-3.
PCT Written Opinion of the International Searching Authority for PCT/US06/016510, filed Apr. 28, 2006. pp. 1-7.

* cited by examiner

FIG. 3A

INDIVIDUAL PARTICIPANT DATA STRUCTURE

Name of participant
Participant's benefit plan sponsor (ie. employer)
Name of participant's direct employer
Name of participant's benefit plan
Participant social security number
Participant mailing address
Participant email address
Participant telephone number
Participant birth date
Participant sex
Participant marital status
Participant's benefit plan anniversary date
Participant's job description
Participant's benefit plan retirement date
Participant's benefit plan beneficiary or beneficiaries (in event of participant's death)

FIG. 3B

PARTICIPANT BENEFIT PLAN DATA STRUCTURE
(ie. PLAN TERMS)

Name of participant
Participant's benefit plan sponsor (ie. employer)
Name of participant's direct employer
Name of participant's benefit plan
Contributions period (may be a year, quarter, month, payroll period, etc.)
Maximum sponsor contribution (may be expressed in fixed amount, a percentage of participant compensation, etc.)
Maximum participant contribution (may be expressed in fixed amount, a percentage of compensation, etc.)
Matching sponsor contribution (usually expressed as function of participant contribution)
Loan amount – a percentage of stock purchases from benefit plan contributions
Maximum loan per participant
Participant's benefit plan retirement date
Participant's gross up percentage on sponsor contributions (may be zero)
Participant's gross up percentage on benefit plan interest payments (may be zero)
Benefit plan includes put contract purchases (yes or no)
Participant is a senior executive or director as per Sarbanes-Oxley Act of 2002 (yes or no)
Federal Reserve Bank (FRB) maximum loan to stock value (LTV) ratio (currently 50%)
First trigger ratio (eg 60%)
Second trigger ratio (eg 70%)
Other trigger ratios
Discount rate(s) for Net Present Value (NPV) computation(s)
If participant terminates (or is terminated) employment, participant elects to
   1. An immediate plan termination; or
   2. A repayment of benefit plan loans; or
   3. Continue benefit plan with existing loans.
Plan permits sponsor or participant contributions after employment terminates (rarely will be allowed)
Benefit Plan purchases put contracts (puts) on its stock assets (yes or no)
Name of sponsor stock for which put contracts (puts) may be purchased
Percentage of benefit plan shares eligible for puts
Last date benefit plan permits holding of puts
Put contract price is original purchase price of stock; or
   Put contract price is value of stock at last put anniversary

FIG. 3C

PUT CONTRACTS DATA STRUCTURE

Plan sponsor stock for which put contracts (puts) may be purchased
Number of stock shares owned by benefit plan
Number of share puts owned by benefit plan
Benefit plan put contracts expiration date
Benefit plan put contract cost basis
Benefit plan put contracts in the money (gain on immediate delivery of contract)

FIG. 3D

BENEFIT PLAN ILLUSTRATION DATA STRUCTURE

- Benefit plan projected participants by age groups
- Benefit plan retirement age
- Participant contributions by age group by year
- Plan sponsor matching contributions by age group by year
- Plan sponsor non-matching contributions by age group by year
- Participant long term capital gain rates by year
- Participant ordinary income tax rates by year
- Plan sponsor long term capital gain rates (n/a for corporations - no capital gains tax rates) by year
- Plan sponsor ordinary income tax rates by year
- Benefit plan loans as percentage of contributions
- Benefit plan loan limits by group
- Benefit plan interest rates by year
- Stock value (share price) in each illustration year
- Discount rate to use in net present value (NPV) computations
- Years where groups purchase put contracts
- Annual put cost as a percentage of annual stock value
- Number of years to illustrate

FIG. 3E

STOCK OPTION PLAN ILLUSTRATION DATA STRUCTURE

Stock option plan participants by age group
Annual stock option grants by age group
Annual book expense at option date under Black-Scholes accounting model
Annual stock share value for each illustration year
Number of years to illustrate
Assumed number of years between stock option grant date and stock option exercise date
Assumed number of years between stock option exercise date and stock sale date
Other data assumptions same as in FIG. 3F

LOAN MONITORING PROCESS

LOAN MONITORING PROCESS

LOAN MONITORING PROCESS

PERFORMANCE TRACKING AND REPORTING
LOAN AND INTEREST

PERFORMANCE TRACKING AND REPORTING LOAN AND INTEREST

PERFORMANCE TRACKING AND REPORTING
LOAN AND INTEREST

PERFORMANCE TRACKING AND REPORTING
LOAN AND INTEREST

PERFORMANCE TRACKING AND REPORTING
LOAN AND INTEREST

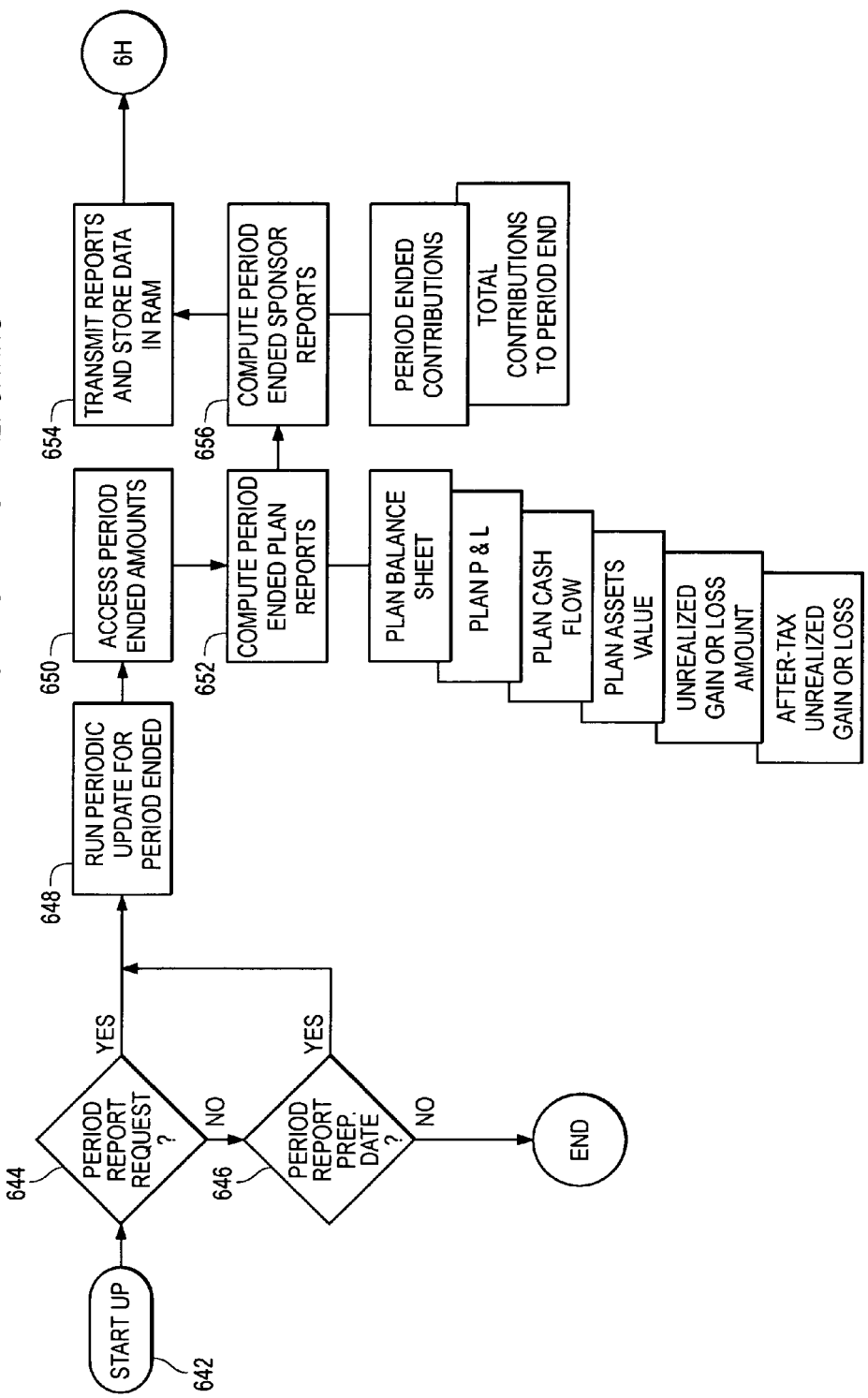

PERFORMANCE TRACKING AND REPORTING
FINANCIAL REPORTING

PERFORMANCE TRACKING AND REPORTING
PARTICIPANT STATUS DETERMINATION

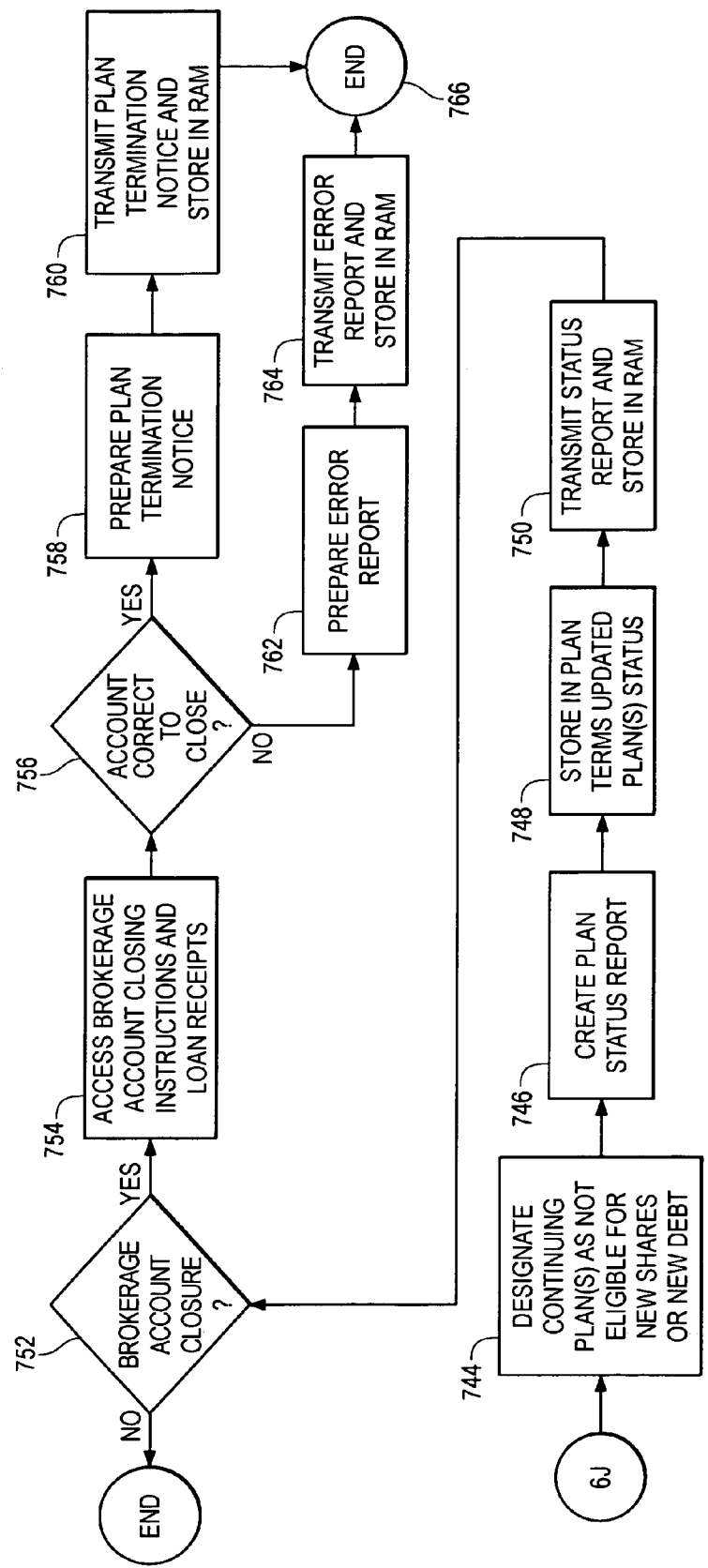

ILLUSTRATION PROCESS

ILLUSTRATION PROCESS

ILLUSTRATION PROCESS

ILLUSTRATION PROCESS

EQUITY BASED INCENTIVE COMPENSATION PLAN COMPUTER SYSTEM

I. RELATED APPLICATION

This patent application claims priority from, and incorporates by reference, Ser. No. 60/459,718 filed on Apr. 1, 2003. This patent application incorporates by reference, but does not claim priority from, Ser. No. 60/459,719 filed on Apr. 1, 2003.

II. FIELD OF THE INVENTION

The present invention is directed to a computerized system and methods for making and using the same, as well as necessary intermediates and products produced thereby. The present invention pertains to apparatus and corresponding methods for performing data processing operations, performing calculation operations, support for administration, or management relating thereto, and in the processing of data all relating to an employer sponsored benefit plan, in the field of, but not excluded to, an ERISA-type plan.

III. BACKGROUND INFORMATION

During the bull market of the 1990's and through 2000, employer stock options became the largest component of the compensation for senior executives at public corporations. Also, the availability of stock options became more widespread. In 1992, there were about 1 million employees holding stock option grants. By 2002, that number had grown to almost 10 million employees. Technology companies particularly embraced stock options. In 2000, CISCO employees exercised options for a total gain of $2.5 billion and Enron employees realized $1.5 billion in stock option gains. In Enron's case, the top 200 of 25,000 employees accounted for $1.2 billion or 80% of the total gain.

A stock option is a right to purchase shares of stock at a set price during some period of time. Most often, the option price is the market price at date of grant and the exercise period is a five to ten year window. Most stock option plans discriminate for the benefit of senior management of a corporation. As such, these plans are "nonqualified" for income tax purposes. The Internal Revenue Code has special rules for Incentive Stock Option and Employee Stock Purchase Plan Option plans. While providing opportunities to tax certain option gains as capital gains, generally these plans require that they be non-discriminatory. As a result, the vast majority of stock option grants and exercises are nonqualified plans. As such, the increase in the share value over the option price in the non-qualified plan is ordinary income to the executive at the date of exercise. Also, the employer receives an ordinary income tax deduction equal to the same amount as the employees' income at the date of exercise.

Generally Accepted Accounting Principles ("GAAP") accounting rules differ from tax rules for stock options. GAAP permits the corporate expense of a stock option grant to be the difference between the current market price and the option price at the date of grant. That difference is normally zero. This is a long standing GAAP rule. Today, the Financial Accounting Standards Board ("FASB") requires corporations to also disclose the estimated fair value of stock option grants to an employee as determined by a sophisticated financial model (FASB Statements No. 123 and No. 148 specify the Black-Scholes valuation model). This fair value accounting is an accounting method that can be adopted by companies.

During 2003, it became apparent that FASB will require some form of Black-Scholes current value expense accounting and soon. In anticipation of this accounting change, during 2003 and 2004 a number of large corporations elected to adopt FASB Statement No. 123 and No. 148 accrual accounting for computing the GAAP cost of stock options. In addition, some companies significantly revised or even eliminated their stock option plans (e.g., Microsoft and IBM). In the past, absent the Black-Scholes model to calculate a present value cost of stock option grants, stock options have had little or no effect on employer earnings. On the other hand, the exercise of stock options by employees does trigger a significant tax deduction without a book earnings charge or penalty. For example, in 2000, Enron reported GAAP earnings of about $1 billion. Because of their $1.5 billion of stock option exercise income tax deduction and other tax shelter items, Enron paid only $63 million in income taxes. That was the first tax paid in five years by Enron despite an average book income of $650 million per annum during the same five year period.

Because of Enron, a number of other high profile corporate failures, and well publicized incidents of executive white collar crime, there is a widespread belief in academia and in Congress that the executive malfeasance during the last decade arose indirectly because of the extraordinary tax benefits of stock options to corporations. GAAP provide no disincentive to counterbalance the opportunity for the privileged few in senior management to use larger and larger stock options to increase their pay. Corporate book earnings were not affected by the grant or the exercise of stock options. The significant tax benefits to the corporation helped to justify the huge and near term wealth created by stock options for senior management. The only apparent consequence was dilution of existing shareholders. With share market value increases in the bull market years, dilution was masked and painless. For too many executives, managing reported income became more important than truly growing their business and earning real revenue—do whatever drives the share price up, became the mantra in the '90s. The consequences have brought scrutiny to the area of benefit plans.

IV. SUMMARY OF THE INVENTION

A. Overview

The inventor herein has made some observations that has led to the present invention . . . an invention created in anticipation of changes in the Financial Accounting Standards Board's (FASB) rules with respect to accounting for stock options, prospective tax rule changes with respect to stock options and the widespread perception that stock options per se have been abused by senior corporate managers to the detriment of the investing public.

Convinced that regulatory change is necessary, Congress and FASB commenced rewriting the rules. In 2003 Senator McCain proposed tax legislation to mandate book and tax conformity for stock option expense reporting by companies. In other words, the timing and the amounts of corporate stock option expense must be the same for book and for tax purposes. FASB issued an Exposure Drafts of new rules on stock option accounting rules during 2003 and FASB projects a final opinion in December 2004 and effective date one year later. Despite the vigorous protests from the technology sector, the only FASB questions are whether to use the Black-Scholes or some other valuation model and how close FASB can come to the International Accounting Standard Board's treatment of stock options. With both the GAAP and the tax rules likely to change in 2004, traditional stock options have lost much of their luster as an equity incentive compensation tool.

In this period of change, the present invention is an attractive way of rewarding and retaining executives and other employees with employer stock based compensation. Equity based compensation is not going to be abandoned by public corporations. In fact, many corporations require that senior executives own company stock worth two to three times the executive's annual salary. These companies need a means to help executives acquire employer stock. Many in academia still believe that stock as incentive compensation for senior executives (and other employees) is the right thing to do—owning shares in their employer motivates an executive to think and behave like an owner and entrepreneur. It is the methodology of providing access to owner's equity that was out of control in the '90s, not the basic underlying concept.

The present invention includes automated support for illustrating and administering a new employer sponsored benefit plan funded with an employer equity security or securities ("stock"). The term stock shall mean any private or publicly traded security representing an ownership interest in an employer's business. While the invention is ideally suited for the publicly trade common stock of a corporation, other forms of business ownership equity are equally applicable—partnerships, trusts, Limited Liability Corporations, Limited Liability Partnerships, etc. The Invention is also known as Equity Based Incentive Compensation ("EBIC").

Furthermore, the Invention includes a computerized system and method for illustrating and administering a benefit plan Plan where the source of funding is a combination of contributions by or on behalf of the employee and loans incurred by the plan Plan. In order to access debt that is non-recourse and/or has favorable terms, the invention includes a comprehensive a loan monitoring system. Prior to implementing such a program, a potential plan sponsor-employer will need to analyze the cash flow and earnings consequences of a proposed EBIC program. Also, the company will want an estimate of the savings benefits to their eligible employees who participate. Accordingly, the computerized illustration system creates financial forecasts to model the performance of the EBIC program. After a program is installed, the efficient administration and compliance with plan terms is assured through the performance and tracking system module interfacing with the loan monitoring system.

B. Summary of the Plan

The EBIC was invented to give employers an attractive equity based compensation tool to use instead of the existing various forms of stock options. The EBIC overcomes many of the inherent deficiencies of stock options once pending tax legislation becomes law and/or new GAAP accounting rules are adopted for stock options. Both the employee and the corporate employer enjoy advantages with EBIC over stock options. However, to operate the EBIC program effectively best utilizes a computer system heretofore unavailable before this invention. A brief explanation of the Plan will give an appreciation of the benefits made possible by the computer system invented for support of the new Plan. Please note that the EBIC program discussed herein is but one example of the application of the process and the Invention software. The principles of the present Invention are applicable to the illustration and administration of a wide range of sophisticated employee benefit funding processes other than the specific program described herein.

The software facilitates multiple purchases of stock on behalf of an employee. The acquisition method avoids the need for an expensive tax gross-up of the contributions to the benefit plan. Notwithstanding, the EBIC program enables the corporate sponsor to record a simultaneous current book and tax deduction for each of its funding contributions. There is no timing difference.

To implement EBIC, an employer creates a written employee benefit plan ("The Plan" or "Plan") setting forth the benefits and terms of the program. The Plan purchases employer stock using two sources of funds. The first source is contributions from the employee (or the employer on behalf of the employee) and the second source is loans from a third party lender. The Plan uses the funds from contributions and loans to purchase and hold employer shares until a predetermined date and/or the employee's death or retirement.

An EBIC program is not a tax qualified—pension plan or otherwise. The Plan neither qualities for nor claims any special tax advantage for itself, the participants, or the corporate plan sponsor. Indeed, one advantage is that EBIC does not rely on an interpretation of the tax law. The Plan taxable income is reported in the year realized on The Plan's trust income tax return. The trust return form K-1 itemizes for each participant/beneficiary his share of taxable income, loss, etc. All Plan contributions are from after tax funds and create the employee's tax basis in the stock acquired. Employer contributions to an EBIC program are taxable income to the participant. Similarly, the employer deducts its contributions to The Plan as current employee compensation expense. In practice, the employer withholds the income tax due on the gross earnings, i.e., on the gross pre-tax amount, before or while making a contribution. Hence the employer contribution is in after-tax dollars. To enable The Plan to invest an amount equal to the employee's pre-tax earnings, The Plan borrows, via a pre-established credit facility, an amount approximately equal to the employee's tax on the contribution.

While The Plan enjoys no special status under the Internal Revenue Code, in most instances The Plan qualifies as a pension plan under the Employee Retirement Income Security Act of 1974 ("ERISA"). As such, The Plan assets qualify for anti-alienation protection under ERISA and are otherwise subject to ERISA rules and regulations. Also, ERISA supersedes state law in employee benefit matters. ERISA requires that plan assets be held in a trust. An employee grantor trust meets the ERISA requirement. EBIC assets are protected by ERISA from both claims of creditors of the employer/plan sponsor and creditors of the employee. Consequently, EBIC assets are bankruptcy proof simply because they are ERISA assets. Also, EBIC programs are not constrained by Internal Revenue Code anti-discrimination rules or contribution/benefit limitations. ERISA constraints are minimal. Thus, the company plan sponsor is relatively free to choose which employees may participate in The Plan and how their participation is to be governed. Finally, the EBIC program obligates the employer (i.e. the plan sponsor) to make contributions to The Plan sufficient to the plan's cost while The Plan beneficiary is an active employee. EBIC costs are identified in the written plan and include as a minimum, interest on The Plan loans. Some Plans will would also identify the purchase of put contracts or similar hedge vehicles as an allowable expenditure. Employer contributions to cover Plan costs are compensation income, taxable to the employee and deductible to the employer.

Normally, THE Plan makes the interest-reimbursement/compensation contributions contingent upon continued employment of a plan participant. Therefore, when an employee terminates prior to retirement, his plan forfeits the opportunity to receive any future contributions (cost reimbursements or otherwise) made on his behalf by the plan sponsor. Also, in a typical EBIC program the terminated employee is obligated to reimburse The Plan for any post-employment plan expenses. If the former employee fails to make contributions which cover plan costs, The Plan may sell participant assets to generate funds to pay for expenses related to that participant. As a consequence, there is an incentive for the participant to stay with the employer to preserve the loan benefits and enjoy the employer's reimbursement of plan expenses.

The following is a simple numeric example of the operation of the EBIC program. The employer designates that 10 shares at $100 can be acquired by the employee in an EBIC program. If employee wages of $1,000 are to be used to fund The Plan, the employer first withholds $400 of income tax and remits the funds to the Internal Revenue Service as withholding tax paid on behalf of the employee. The remaining $600 is contributed to the EBIC program by the employer. Assuming a deemed 40% tax rate in the written plan, the EBIC can borrow $0.67 for each contributed $1.00. Accordingly, the employee (ie. the employer on the employee's behalf) contributes $600 and The Plan borrows $400. At this point the employee/beneficiary is in the enviable position of controlling 67% more shares than if he was limited to investing with just his own after tax dollars.

Of course, during the term of a plan, The Plan pays interest on the loan; for purposes of this example, assume the annual interest is $20 i.e. 5% of the $400 loan. Also, under the terms of The Plan, the employer is obligated to contribute funds to the EBIC program sufficient to meet the expense obligations for all Plan participants who are active employees. When The Plan receives a $20 contribution, the employee reports $20 of compensation as taxable income on his W-2 and the employer deducts the $20 as compensation expense for book and tax. In addition to the $20 of compensation to report, the employee also incurs $20 of investment interest expense via The Plan. This investment interest expense is reported to him on the K-1 supplied by The Plan. Under current tax rules, the investment interest expense is tax deductible to the extent of investment income reported from all investment sources of the employee. Unused investment interest expense deductions carry forward indefinitely and are available to offset the employee's future investment income. Accordingly, the $20 is both income and interest expense to the employee participant. For many participants, the two items would offset in the calendar year they are reported.

The employer's cost of the EBIC program is simple to compute. For example, when The Plan contributions to purchase stock are made solely by the participant, the employer's cost is its contributions to cover the purchase of put contracts, administrative expenditures, and interest expense. In the above simple example, that expense is $20. Because this expenditure is a compensation expense which is dependent upon the continued employment of the participant (excepting any minor timing differences) the book expense, the tax expense and the plan sponsor cash flow expenditure all fall within the same time period. These same accounting rules apply where The Plan calls for a contribution to match an employee's contribution or The Plan calls for unmatched employer contributions.

Now assume that the proposed tax legislation and new accounting rules are both in effect for stock options. Accordingly, GAAP rules compute a present value gain of the option to the employee and an equal compensation expense to the employer using a Black-Scholes or similar model. The corporate tax deduction equals the company's book expense.

Further assume a stock with a current value of $100 per share and a future value of $225 when the ultimate exercise of the stock option occurs. Ten options are granted. The projected gain is $1,250 at an option exercise date—ie $125 per share. That present value of the gain is $500 at the date of grant per the accounting valuation model. The $500 is the book and tax expense of the employer at the date of the option grant. Since the taxation of stock options to employees remains unchanged, the executive reports $1,250 of ordinary income at the stock option exercise date. Thus the exercise of the option triggers $500 of tax due without regard to whether the optioned shares are then sold or are held thereafter for appreciation by the owner of the stock option.

Under an EBIC program, the executive/participant's plan purchases 10 shares of employer stock with a combined tax basis of $1,000 and subject to $400 lien. From the executive's point of view, with EBIC he buys his shares with pre tax dollars whereas under a stock option plan the executive must use after tax cash for his purchase. If the employer shares are sold at the same price as above, $225 each, the long term capital gains tax is $250 or one half of the tax due on the stock option. A numeric comparison of the two choices is set forth below.

| Plan Type | Stock Option | EBIC Program |
|---|---|---|
| Sales Proceeds | $2,250 | $2,250 |
| Cash Invested | $1,000 | $ 600 |
| Tax | $ 500 | $ 250 |
| Loan | N/A | $ 400 |
| After-tax Profit | $ 750 | $1,000 |

In the above example, the executive has gained $250 of additional wealth or one third more in assets via the EBIC program rather than a traditional stock option. Still, there are disadvantages to both alternatives. In the example, EBIC requires up front cash for the executive to initiate his participation. With a stock option, the executive does not have to make an investment until the exercise date. On the other hand the stock option gains are taxed as ordinary income at the exercise date. With EBIC, the executive's the tax is only incurred on the ultimate sale of the stock acquired through The Plan. With the stock option, a significant and first tax is triggered by exercising the option to buy the security. With EBIC, there is no interim "exercise" date to trigger gain as with a stock option. Typically, a Plan only triggers taxation to a participant at termination when The Plan sells assets to retire The Plan's debt for a participant or a participant subsequently sells stock distributed by a Plan.

The first year corporate GAAP cost under EBIC is substantially less than with a stock option plan. The employer cost of the EBIC program is the loan interest—which the employer contributes to The Plan. The employee is buying stock and is enjoying a loan interest subsidy. Under the Black-Scholes model, the employer is charged with a cost that can be from 20% to 80% of the current market value of the stock. In our example, we assumed 50% or $500. From a book earnings point of view, EBIC is much less expensive in the first Plan year versus the option grant year. Again, in our example the interest cost is $20 ($400 debt times 5% interest rate) assuming that the EBIC loan was incurred at the beginning of the year. If the loan was incurred at the last day of the year, then a full year's interest of $20 would be an expense in the following fiscal year. Either way, the first year book expense difference is very large:

| INCENTIVE PLAN | BOOK EXPENSE |
| --- | --- |
| Black-Scholes-Stock Option | $500 |
| EBIC Begin of Year | $ 20 |
| EBIC End of Year | $ 0 |

Of course, an EBIC book cost occurs each subsequent year the executive remains in The Plan. Essentially, EBIC spreads the expense over the "option" period whereas Black-Scholes accounting for stock options require a one time and significant first year charge to earnings for its incentive grant to the employee.

Returning to the employee's perspective, it is important to recognize in the above example that he is out-of-pocket $600 at the beginning of stock acquisition cycle. With the traditional stock option plan, the participant writes a check for the stock (and pays ordinary income tax on the stock appreciation) when the option is exercised. Of course, if an employer underwrites the full cost of participation in EBIC and does not require any employee contributions, then the employee's out-of-pocket cost becomes zero. Returning to the above example which assumes The Plan acquires 100 shares of stock, the employer plan cost is $1,000—the ten shares at $100 each. The after-tax employer cost is $600.

EBIC programs can be designed to allow executives to contribute up to certain fixed amounts to The Plan, and the employer can provide a matching contribution governed by The Plan's formula. For example, the employer might contribute $0.50 or $1.00 of after tax funds for each $1.00 of participant contribution.

To demonstrate the consequences of a matching provision, assume a Plan provides a dollar for dollar matching of allowable contributions from the participant. Our example executive contributes the maximum allowed under his plan—$300. With the employer match, the total contributions are $600. Adding a loan of $400, The Plan acquires $1,000 of employer shares as in the first iteration of the example. In this instance, the participant realizes more than 70% additional gain than the stock option alternative:

| Plan Type | Stock Option | EBIC Program |
| --- | --- | --- |
| Sales Proceeds | $2,250 | $2,250 |
| Cash Invested | $1,000 | $ 300 |
| Tax | $ 500 | $ 250 |
| Loan | N/A | $ 400 |
| After-tax Profit | $ 750 | $1,300 |

Of course, the employer cost would increase by the amount of the matching cost paid. A $300 after tax match costs the employer $500 pre tax (at a 40% tax rate). If the EBIC and stock option plans are implemented at year end, the book costs are equal in the first year: If EBIC incurs a full year of interest expense, then that $20 is an additional EBIC book charge.

| INCENTIVE PLAN | BOOK EXPENSE |
| --- | --- |
| Black-Scholes-Stock Option | $500 |
| EBIC Begin of Year | $520 |
| EBIC End of Year | $500 |

The Invention system also enables the employer to offer a put option on employer stock. If the employer stock declines in value, The Plan exercise its put, realizes cash (with no taxable gain or loss), and repurchases employer stock at a lower cost per share. (An alternative but less tax efficient approach would be to close the put contract at a gain and use the proceeds to purchase additional shares of stock. The Plan would have the same number of shares via both routes, but more taxable gains to report with a sale of the put contract.) Afterwards, The Plan owns more shares with no change in the original investment. With such a structure, The Plan avoids loss of capital via the put. The Plan can make the funding cost of a put the responsibility of the employer or the employee—or some combination thereof. Where the employer makes a contribution to the Plan sufficient to fund the put cost (lets say, $5), the total annual cost of the EBIC program becomes $25 (adding the $20 interest from above). Also, the annual cost of the put would decline where the put price is fixed at the original cost basis of the stock ($100 in our example) and value of the stock grows over time. Accounting for the cost of the annual Plan expense reimbursements ($25 in year one) is the same for GAAP and tax—employer contributions are reported as employee compensation.

One elective feature permits the employer to pay Plan participants a tax gross up on some or all contributions to the EBIC program to cover the put purchases, interest expense, administration and/or other Plan expenditures. Another optional feature is a series of annual rolling puts that start with each year's beginning share price and thereby locking in the prior year's appreciation. Such a provision adds cost to The Plan, but also adds a very attractive executive incentive compensation benefit. Whatever stock appreciation occurs over the initial Plan purchase stock basis for each year is a gain The Plan participant gets to keep. The Invention illustration software provides cost estimates of these additional features and thereby helps an employer to select the features it wants to offer.

At a specified age, death, date, or at retirement, an EBIC written Plan plan calls for a distribution of its assets to the participant. (Alternatively, The Plan could require the sale of its assets and a distribution of cash the participant). Before a distribution occurs, to comply with ERISA, The Plan repays its outstanding loans. ERISA prohibits asset distributions subject to debt. The loan repayment comes from a sale of selected (or all) plan assets i.e., the employer stock. Once The Plan debt is retired, plan assets (cash and/or the remaining stock) are distributed to the participant.

For income tax reporting purposes, all activities of the EBIC program flow through to The Plan participant(s). In most instances, a grantor trust is the entity to hold The Plan assets and each year the trust provides a participant with a Form K-1 reporting the amounts of gains and losses (ordinary and/or capital) by attribute (interest expense, dividend income, etc) to be included in the participant's income tax return. Where a particular EBIC program calls for a full liquidation of all investments at The Plan distribution date, all gains and losses from The Plan assets and all Plan expenses are reported for income tax purposes to The Plan participant at that point in time. If The Plan only liquidates sufficient assets to retire the loan at the distribution date, then the only gain or loss recognized at that time is from the stock (and other assets, if any) sold by The Plan. The remaining stock is distributed to The Plan participant in-kind. Since The Plan vehicle holding the assets is a grantor trust, the "in-kind" change in ownership is a not a taxable event. The holding period and tax basis carry over from the grantor trust to the participant-recipient.

It is possible for an employer to create an EBIC program that extends past the retirement of the participant. Doing so, however, generally requires The Plan sponsor to shoulder the annual administrative responsibility and cost with respect to The Plan into a future when employee incentives are not relevant. While the inventor of EBIC anticipates that a continuation of The Plan through retirement is certainly a possible application of the invention, it is not likely. A final distribution at a predetermined date or the participant's retirement date is the simple and most cost effective approach. Once the distribution occurs, the employer is no longer involved with the beneficiary (e.g., the retiree) and The Plan terminates with respect to that participant. Most employers prefer a clear break point that separates them from their former employee's personal welfare and retirement affairs.

For some, a final distribution occurs prior to the written Plan date. For all Plans, death of the participant triggers an early distribution. When an individual resigns or is asked to leave a company, the EBIC program typically offers the terminated individual with three options. First, he can elect to receive a final liquidating distribution (net of loan and interest repayment). Secondly, the individual can elect to have The Plan sell sufficient assets to retire the plan's debt and accrued interest. With this second election in place, the participant receives his distribution of the remaining assets at the date originally specified in The Plan when he was an employee. Either way, the terminating Plan participant avoids having to make contributions to cover future loan interest obligations by retiring his portion of The Plan's debt at termination. Finally, a Plan may permit a terminating employee to elect to leave The Plan loan in place. Again, because EBIC is an employee incentive, the vast majority of plans will have the ex-employee-participant contribute funds to meet plan expenses.

On Jul. 30, 2002 the Sarbanes-Oxley Act ("Act" or "Sarbanes-Oxley") became law. Sarbanes-Oxley is a strong Congressional reaction to accounting failures and officer malfeasance uncovered at some major public corporations during the first few years of this century. The Act grants the Securities & Exchange Commission (SEC) new regulatory powers, requires new corporate financial reporting by SEC registrants, and creates a new governmental accounting body with oversight of SEC registrants. Sarbanes-Oxley also prohibits SEC registrants from making loans to their directors and senior officers. More precisely, Section 402 of the Act prohibits personal loans to a director or a senior executive officer of an SEC registrant. This prohibition applies where the loan was arranged by the registrant or the loan was indirectly or directly extended by the registrant. While expert SEC lawyers unanimously agree that an EBIC program, with participants who are directors and senior officers, does not violate Act Section 402. Still, the SEC has steadfastly refused to respond to any requests for guidance on any factual determination of the application of Section 402 or other sections of the Act. In response to this minor uncertainty, the Invention includes an optional application which circumvents exposure to a possible interpretation that the EBIC program violates Section 402 of the Act. Under this option, employer matching of employee contributions to a plan may occur in the same form and fashion as above to purchase stock and/or put contracts. What is different in this iteration of the Invention is that the participant must make an election to have his plan borrow additional funds to buy additional stocks. Also, the participant is responsible to make timely contributions to provide The Plan with funds to meet its interest expense obligations. Failing said contributions, The Plan has the authority to sell Plan plan assets or incur additional debt to meet plan interest obligations.

One aspect of the EBIC program is the loan and the loan monitoring process. The loan is non-recourse as to the plan-sponsor, to the plan-fiduciary and the plan-participant. The collateral for the loan is the stock held by The Plan. Periodically (typically overnight) the computer system obtains and compares The Plan assets' market value with The Plan loans outstanding and reports to the lender and The Plan administrator when certain pre-determined Plan defined ratios are exceeded. With daily access to asset values of the stock held by The Plan as collateral, the lender is able to protect itself from a loss on the loan even though the debt is non-recourse. Without the software to perform this periodic monitoring function, non-recourse loans are not available. Without asset and loan monitoring software, lenders are exposed to the risk that an unmonitored market decline will allow their collateral to become worth less than the amount of the loan before the lender can react.

The Federal Reserve Bank Board of Governors has the statutory authority to administer "margin loans"—debt secured by securities. For purposes of these Federal Reserve Bank rules, "securities" are equity or stock instruments. Bonds or similar interest bearing instruments are not securities for purposes of margin rules. There are two sets of margin rules—"Regulation T" ("Reg. T") is for broker-dealers lending to their brokerage customers. "Regulation U" ("Reg. U") applies to all other lenders. EBIC programs use Reg. U lenders. Under Reg. U, lenders are prohibited from making additional loans where the fair market value of the collateral is less than 50% of the loan amount. The test applies each time a loan is advanced. The Invention software monitors the loan to value ratio for each Plan and notifies the lender when a proposed loan violates the Reg. U requirement. Receiving this automatic analysis periodically, the lender is assured that any loan advances are in compliance with the Federal Reserve Bank regulations.

The rules under Reg. T are the most familiar margin rules. Stockbrokers are required to maintain no more than a 50% ratio of loans secured by securities purchased by their customers. Accordingly, there are "margin calls" for additional funds to be deposited with the broker and sales of collateralized shares when "margin calls" are not met. Falling under Reg. U has the decided advantage of not having to have "margin calls." Once the 50% ratio is exceeded, the lender simply cannot make any further loans—it does not have to reduce existing loans by liquidating account assets. Again, it is important that the lender to a Plan qualify as a Reg. U lender.

To provide timely information, The Plan loan to value ratio computations are completed and reported frequently (e.g., daily). The EBIC system electronically computes the periodic loan to value ratios for multiple Plans and each of the individuals within an EBIC program. This information is distributed electronically via modem or the internet to the end users. Prompt and accurate reporting to the lender is particularly important. As noted above, banks or other lenders insist on timely access to the fair market value of their loan collateral and loan to value ratios when non-recourse debt is in place.

C. Summary of the Computer System

The present invention is a computerized system and methods to support, illustrate, and administer a sophisticated, employer sponsored (but not tax qualified) pension plan, such as, an EBIC program. The computerized system makes possible an EBIC program with its attendant benefits to plan sponsors and their employee-participants.

It is noted that the system initially accesses, loads, and stores a variety of information on the system's computer readable memory. This information includes data that is specific to each participant and/or Plan: name, social security number, address, e-mail address, telephone number(s), birth date, sex, Plan name, employer, employee identifying data, stock purchase dates, allowed share purchases on stock purchase dates, loan percentage amount, election to pay off Plan debt, election to not incur debt, election to incur maximum Plan debt or a lesser percentage, employer maximum Plan loan amount (if any), gross-up percentage on interest (if any), employer matching contribution percentage or amount (if any), distribution election with respect to gains reported for tax purposes, early participant termination elections, participant retirement termination elections, Plan retirement age, hypothetical return on Plan assets (if any), assumed interest on Plan loans (if any), and type of security (common, preferred, convertible preferred, etc). In addition, the system receives and stores the parameters of each sponsor's EBIC program in the computer readable memory. For example, different EBIC programs have different loan ratios. In addition, the system processes and stores Plan activity data on the system's computer readable memory. Individual Plan data includes participant loan balance, accrued interest, number of shares by type held, dates of share acquisitions, tax basis of shares, realized gains and losses, unrealized gains and losses, contributions received, interest paid, dividends received, put contract, put purchase cost, put termination date, and other expenses. The system retrieves this information as needed to prepare reports and to update data fields as time and events unfold. The system performs even if one or more data fields are empty. The system can accept new data fields as EBIC responds to the needs of employers and employees.

The computer system facilitates the use of puts (or other hedge vehicles) in conjunction with the acquisition of employer stock. The system monitors and compares the put contracts to the market value of the stock. The system provides on demand reports of this comparison to the administrator, the lender, and the participant. Also, the system provides early notice of the expiration date of put contracts to the administrator, the lender, and the participant.

A put protects the employee-participant from a loss when Plan assets decline in value. With the protection of a put, participants have a strong incentive to accumulate stock holdings in the EBIC program. The least return on said Plan investment is no return. The participant simply receives a return of his contributions to The Plan. For many IRC Section 401 (k) participants today, the simple return of their original investments is a cause for celebration. Having a put feature makes the program all the more attractive to participants.

Finally, the Invention includes a computer system for illustrating the performance of a hypothetical EBIC program and for computing the costs of alternative features the corporation may offer. Also, this system forecasts the future performance of an existing Plan. The system software forecasts the pre-tax and after-tax cash flows to participants under various assumptions. For the corporate plan sponsor, the illustration module projects the after-tax cash flow cost and the earnings charges arising from offering the EBIC program to employees. The system also can prepare comparisons of the results of an EBIC program implementation versus a stock option plan.

V. BRIEF DESCRIPTION OF THE DRAWINGS

FIG. 3A is a columnar depiction of information data fields collected, processed, stored and retrieved by computer system 100.

FIG. 3B is a columnar depiction of information data fields collected, processed, stored and retrieved by computer system 100.

FIG. 3C is a columnar depiction of information data fields collected, processed, stored and retrieved by computer system 100.

FIG. 3D is a columnar depiction of information data fields collected, processed, stored and retrieved by computer system 100.

FIG. 3E is a columnar depiction of information data fields collected, processed, stored and retrieved by computer system 100.

FIG. 6G is a block diagram of the periodic performance tracking and reporting process of the present Invention.

FIG. 6K is a block diagram of the periodic performance tracking and reporting process of the present Invention.

VI. DETAILED DISCLOSURE OF A PREFERRED EMBODIMENT

Figure 1:
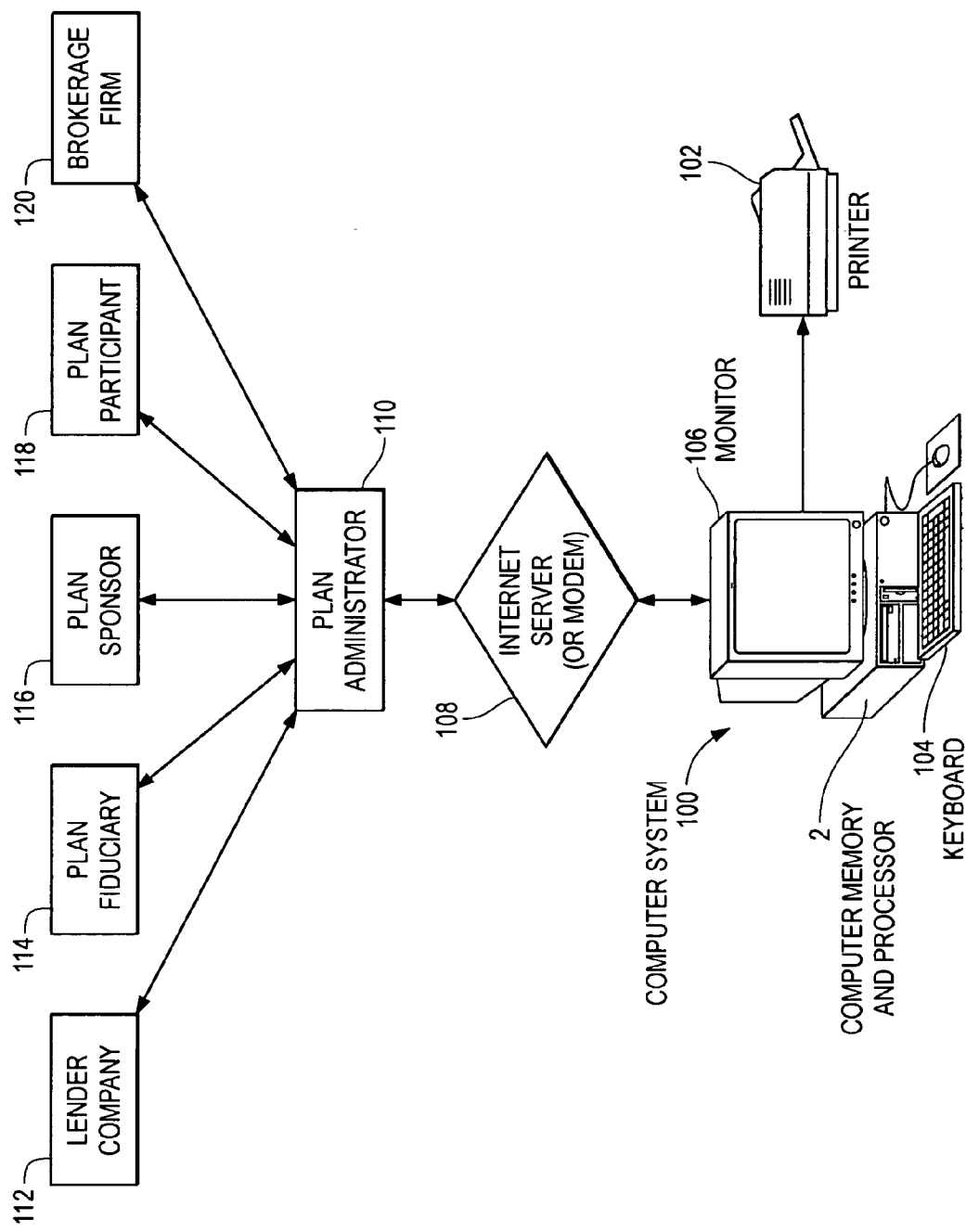
FIG. 1 is a diagram of an exemplary computer system according to the present Invention, linked to a plan administrator's computer system which is linked to a lender computer system, a put underwriter computer system, a market information vendor or a broker computer system, and a Plan participant computer system.

The loan monitoring function is useful for implementation of The Plan. The Invention monitor the fair market value of The Plan assets (i.e., stock and if applicable, put contracts) to ensure that there is sufficient collateral for The Plan loans. Generally, under ERISA a lender must be unrelated to the employer or other "parties in interest" in the transaction. Still, a lender that qualifies under DOL Prohibited Transaction Exemption 75-1, can loan to an ERISA Plan and use the employer's (that is also the plan sponsor) stock as collateral.

For shares owned by The Plan and traded on one of the public exchanges, the Invention obtains and electronically records the fair market value of The Plan's stock periodically (e.g. each trading day). Also, the system computes and stores the periodic loan balance and the related accrued interest. Accordingly, for each participant in an EBIC program, the system periodically computes a ratio of the participant's loan plus accrued interest divided by the fair market value of The Plan assets. Once computed, the loan to value ratios are sent electronically via modem or internet to The Plan lender, and stored in the computer memory. Based on The Plan, this data can also be provided electronically to the participants, the plan sponsor, and/or the administrator.

Accordingly, with loans made to an EBIC program, each day the lender determines the adequacy of the collateral. Because the loan terms offer the lender the capability to rapidly convert the collateral to cash, it is not necessary for the lender to have loan guarantees from the participant or plan sponsor. From the lender perspective, it is important that this information be accurate and timely.

The computer system of the invention tracks stock values through electronic reports from a trading exchange, a brokerage company, or a third party information vendor via modem or the Internet. Most banks do not have systems in place to make daily collateral adequacy computations. The EBIC computer system independently computes and tracks loan and interest balances. There are two advantages for a lender when the EBIC system performs the loan tracking. First, there is third party "audit" or verification of the loan and accrued interest balances. Second, the lender is not forced to track individual Plan participant accounts. They can administer each EBIC program as a single loan. Individual Plan participant problem loans are addressed on an exception basis when the EBIC system identifies and reports a participant loan falling below the 50% loan to value ratio specified by Reg. U.

Simply knowing the loan to value ratios does not protect the lender from default. The lender is protected where the loan includes a grant of rights from The Plan to the lender to convert the collateral. The first conversion right is from stock to a money market fund. The second conversion right is a sale of the collateral and application of the sale proceeds to retire the debt.

A preferred embodiment of these types of loan provisions and the EBIC program monitoring system is as follows. After each periodic computation of the loan to value ratio, the system creates an electronic record of the loan to value ratio for each participant. Normally, these computations are performed overnight and the reports are delivered electronically via modem or the internet to the lender prior to the opening of business on the next, business day. Where loan to value ratios are equal to or greater than 50%, the system creates a separate exception report. The same report includes a notice to the lender that, pursuant to Reg. U, no further advances are allowed to the noted Plans. (Of course, Plans not on the report are eligible to receive further loans.)

In addition to the 50% ratio exception report, the system generates electronic reports which catalog loan to value ratios which equal or exceed certain Plan pre-determined trigger ratios (hereafter "Trigger Ratio"). Trigger Ratios are part of The Plan document and the loan agreement. Once a Trigger Ratio is equaled or exceeded, daily the system sends a report to the lender, plan administrator and participant. These reports are sent electronically via the internet or a telephone modem. When a Trigger Ratio is met, the lender has rights that are enforceable per the loan agreement without notice to or approval of The Plan, the participant or any other party. At the first Trigger Ratio (e.g., 60%), the participant is sent a warning that the loan ratios are declining, loans are no longer available since his ratio is greater than 50% and a notice reminding the participant what happens when subsequent Trigger Ratios are met. At the next Trigger Ratio (e.g., 70%) the lender has the right to instruct the plan administrator that the stock and any other Plan assets are to be sold and re-invested in a money market account. If the final Trigger Ratio (e.g., 80%) is reached, the lender requires the plan administrator to liquidate Plan assets sufficient to retire the outstanding debt and any accrued interest owed. Of course, a Plan can be structured with only one or more than three trigger ratios.

With this process, the lender is assured that the collateral always exceeds the loan balance. The system is designed to track and report The Plans that have hit Trigger Ratios on a daily (or other periodic) basis as required by the lender. Due to the periodic electronic reporting by the invention, a lender is able to act promptly once a Trigger Ratio is reached. Because of this detailed and timely reporting system, the lender's risk of loss is eliminated. With low risk to the lender, Plan loans are available and with attractive interest rates.

In addition to loan monitoring, the invention prepares and provides periodic historical accounting reports for the plan sponsor, fiduciary, administrator and participant(s). The plan administrator uses the system generated information to prepare periodic (e.g., monthly, quarterly, annual) reports for the fiduciary and participants. The system reports include some or all of the following data for a period or periods: stock value(s), changes in stock value(s), number of shares of stock held by a plan, cost basis of shares held, gains and/or losses from stock sale(s), dividends received, plan administrative expense, accrued interest expense, interest paid, other plan income, other plan expenses, contributions received from the sponsor and/or the participant, distributions to a participant, trust capital account beginning and ending balances, put contracts in force, cost basis of put contracts, future put expiration date(s), loan receipts, loan retirements, loan balances, loan to value ratio(s), and trigger ratio(s). Data from the system is transmitted to the ERISA plan fiduciary and to the plan administrator to prepare the annual Form 5500 for submission to the Department of Labor, the annual participant plan report required by ERISA, the annual grantor trust tax return(s) to be filed with Internal Revenue Service and the Form K-1s for each participant to report his items from the plan for inclusion in his annual tax return(s). Finally, the Invention system provides data for the lender to include in its annual report to the Federal Reserve Bank for compliance with Reg. U.

There is a significant tax advantage to a participant when The Plan reports and maximizes long term capital gains versus short term capital gains and ordinary income. Generally the federal income tax rate on long term capital gains is a maximum of 20% versus the top ordinary income tax rate of 39.5% for most executives. Also, many states have reduced tax rates applicable to long term capital gains. An advantage of lower tax rates is more money left to spend after tax. The proper tax planning strategy is to hold stock for long term gain tax treatment. When income taxes are due, incur the lowest tax at the long term capital gains rate of 20%. (Note—until 2010 the federal long term capital gains rate be at a special but, temporary reduced rate of 15% and maximum ordinary income rates be 35%.)

This invention system computes and tracks all values required for income tax reporting for each plan participant. This data will be accessible to a participant electronically via a modem or the internet. Without this system, proactive tax planning would be difficult if not impossible for a participant.

If a Plan incurs taxable income, the system determines if the participant has made an election to receive a cash distribution from a plan when a taxable event occurs. This election is made at inception of The Plan and is subject to change by the participant on the anniversary date of The Plan. Also, when drafting the plan instrument, the company sponsor of The Plan designates the amount that The Plan is allowed to distribute when it realizes taxable gains. Typically, a distribution of 20% of the reported gain is allowed in years prior to the final distribution of plan assets and winding up The Plan with respect to a participant.

Because individual participants make different elections and an individual participant may be able to change his election over time, the Invention system computes and stores all Plan data on an individual participant basis. These multiple computations and voluminous data storage are only done economically by a sophisticated computer system.

The system monitors and reports the attributes of put options owned by The Plan. At a date prior to the put contract expiration, the system prepares electronic reports for the plan administrator, participant, and put underwriter, that the contract is due for renewal or requires delivery of the shares due under the put. As noted above, the system also tracks put contract value for purposes of the loan monitoring function.

The illustration system module supplements the functions of monitoring Plan loans and preparing user reports. The illustration system data input is a series of Plan assumptions: age and sex of groups of participants, retirement ages by group, annual contribution amounts by group (by employer and/or by participant), employer matching contribution rates, income tax rates for the employer and the participant, loans as a percentage of plan contributions, loan interest rate(s), annual stock value appreciation rate(s) and/or depreciation rate(s), annual stock dividend rate or amount, put cost and put contract duration. For each participant group, the illustration module forecasts on a periodic basis: employee contributions, employer contributions, loan amounts, stock purchases, stock gains, stock losses, interest expense, administrative expense, annual income tax items to be reported by participant, participant periodic after-tax cash flow amounts, a plan termination date, a total gain or loss, a simple accounting rate of return, an internal rate of return, and a present value amount. Also, for each participant group the illustration module forecasts on a periodic basis for the employer-sponsor: the periodic after-tax cash flow cost of plan contributions, the GAAP accounting expense, total after-tax costs, and the present value of the cost.

Finally, the system compares the performance of the illustrated EBIC program to an illustrated stock option plan. With a single set of assumption data, the system can generate an accurate comparison of the EBIC program with a stock option plan. Alternatively, the system uses a third party illustration of a stock option plan for a comparison. Since EBIC is a new program that has not previously been proposed or employed, potential users will need illustrations that demonstrate the performance of the new plan as compared to the long existing stock option alternative.

Referring now to the drawings, and initially FIG. 1, there is set forth a system architecture diagram according to the present invention. A computer system 100 is coupled by a computer-to-computer communication device, such as, for example, an internet server 108 to a plan administrator's computer system 110. In the diagram, the plan administrator's system also serves as the conduit for data transfers to and from other parties of interest, including, a lender company's computer 112, a plan fiduciary's computer 114, a plan sponsor's computer 116, a plan participant's computer 118, a brokerage firm computer 120. The plan administrator's connection to these other computers most likely will be via an internet server, at an intranet server or modem might also be possible in certain circumstances.

Separate and equally viable embodiments of the present invention would link computers 112, 114, 116, 118, and 120 directly computer 100 in addition to or instead of using computer 110 as a conduit.

According to the separate invention, the computer system 100 is operated by the plan administrator of a funded benefit plan (non-qualified for tax purposes) such as, for example, an EBIC program. As such, the computer system 100 is external to the computer systems at 110, 112, 114, 116, 118, and 120. The computer system 100 is programmed to receive, process, and store plan event data. This data is then used to prepare historical performance computations and various measures of financial performance. The computer system 100 also uses event data to monitor the adequacy of the loan collateral under the loan agreement and assure compliance with Federal Reserve Bank leading rules. Finally, the computer system 100 permits the user to make assumptions about a hypothetical benefit plan and project its financial consequences. In addition, the computer system 100 can compute the financial results of a traditional non-qualified stock option plan and compare the results to those of an EBIC program.

Typically, the computer system 100 comprises a processor, such as an Intel PENTIUM™, memory 2 (e.g. a RAM memory and secondary memory devices such as a UBS jump drive, a CD-ROM drive, etc.) an input device (such as a keyboard 102, mouse and/or trackball) an output device (such as a printer 102 or a computer monitor 106) and an internet server device 108 transmit and to receive data and other communications via the internet (a modem is an alternative transmission device). The computer system 100 also include an operating system such as, for example, the Microsoft Windows XP operating system. Also, the computer system 100 includes 4 modules:

> Periodic Updating algorithm 4A, a Loan Monitoring algorithm 5A, a Performance Tracking and Reporting algorithm 6A, and an Illustrating algorithm 7A. The first three modules are programmed to reflect the a specific sponsor's benefit plan design and the fourth module, Illustrating 7A, permits the user to select hypothetical design features to be reflected in the computer system prepared 100 illustration.

Figure 2:
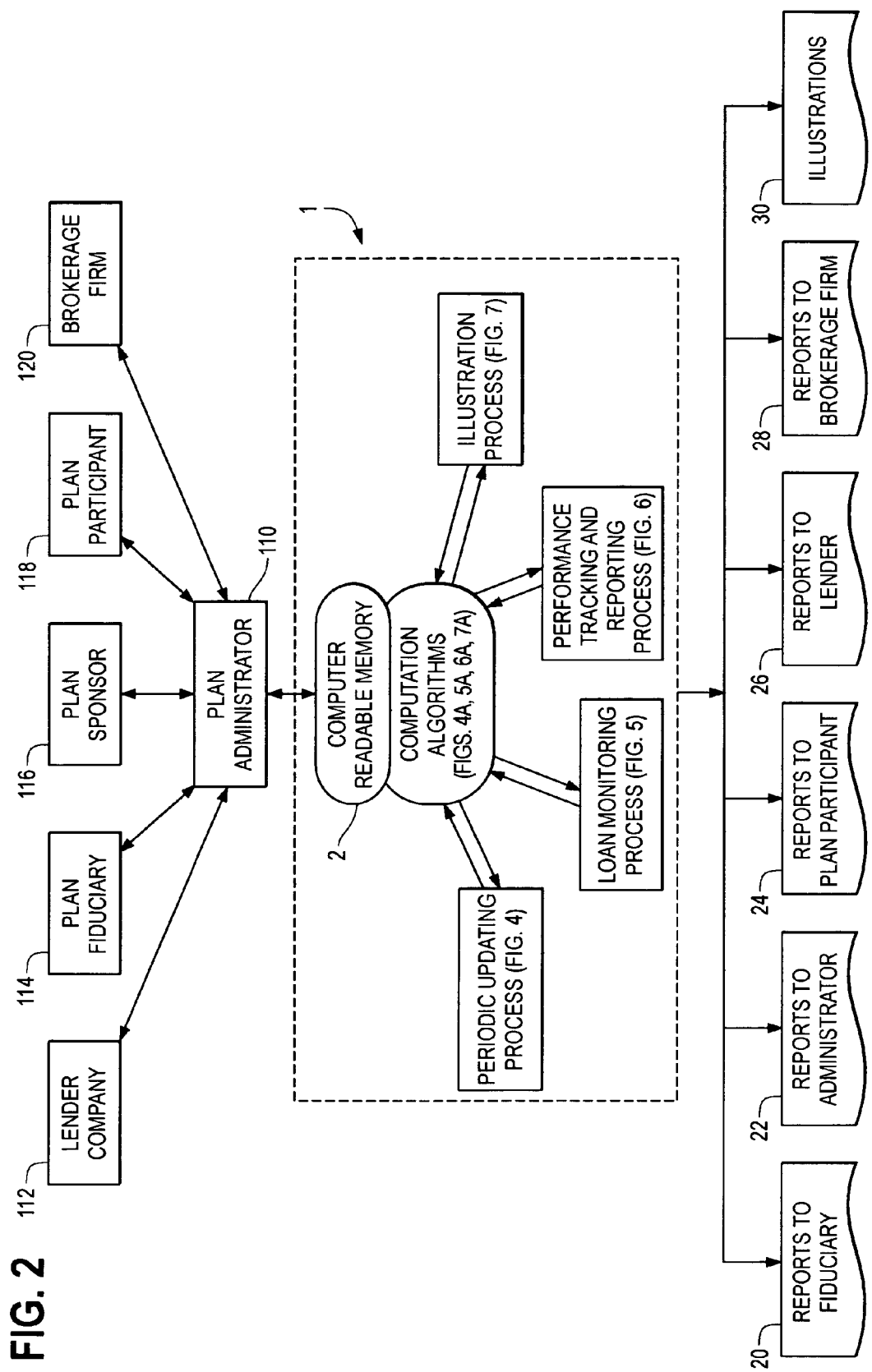
FIG. 2 is a block diagram presenting an overall view of a representative embodiment of the present invention.

FIG. 2 is a block diagram showing the software components 1 as they structure the functionality of the present invention. Certain software components control the operation of and provide the functionality to computer system 100. The current embodiment of the present invention includes four separate process systems which can run simultaneously or separately: Periodic Update Process 4, Loan Monitoring Process 5, Performance Tracking and Reporting Process 6, and Illustrating Process 7.

In general, information transfers to and from computer system 100 and plan administrator system 110 (or alternatively between computer system 100 and systems 110, 112, 114, 116, 118, and 120). In the current and preferred embodiment of the invention, the plan administrator 110 is the transferor and recipient of all information to and from computer system 100. (Alternatively, all external systems could be in direct communication with computer system 100.) Accordingly, plan administrator 110 collects and transmits to computer system 100, information such as benefit plan census data, actual benefit plan events such as contribution receipts, benefit plan terms such as the availability of plan put contract purchases, user selected variables such as a net present value (NPV) discount rate and illustration assumptions such as future loan interest rates to include in a forecast of a benefit plan, or a benefit plan and a stock option plan, financial performance(s). Upon receiving information, computer system 100 stores the information in memory 2 according to the data structures of the present invention. This allows the computer system 100 to read information from memory 2 for use in the various system processes.

Each of the four system processes, Periodic Updating Process 4, Loan Monitoring Process 5, Performance Tracking & Reporting Process 6, and Illustration Process 7, generates reports reflecting its computations, data sorts, and data processing. To facilitate distribution of reports, the plan administrator 110 codes report distributions as to which system should receive which report. Accordingly, plan administrator 110 electronically receives and stores each reports and its system electronically re-sends a received report to a lender company 112, a plan fiduciary 114, a plan sponsor 116, a plan participant 118, and/or a brokerage firm 120, depending the report's coding.

FIG. 3 sets forth in columnar form various data input items received from the plan administrator 110 by the computer system 100.

FIG. 3A reflects in columnar form the participant data structure that transfers from the plan administrator 110 to the computer system 100. This information is first gather by the plan sponsor 116.

FIG. 3B reflects in columnar form the participant benefit plan attributes and limitations by participant. This information is received from plan administrator 110 by the computer system 100, after originating at the plan sponsor 116.

FIG. 3C reflects in columnar form the put contract data items used by computer system 100 in the loan monitoring process 5, the performance tracking and reporting process 6, and the illustration process 7. The put data originates from the brokerage firm 120, where the participant plan assets are held and is forwarded electronically to the plan administrator 110 for further transfer to memory 2.

FIG. 3D reflects in columnar form data items to permit the computer system 100 to prepare illustrations 30 of a benefit plan.

FIG. 3E reflects in columnar form data items for the computer system 100 to compute illustrations 30 of a stock option plan.

Figure 4:
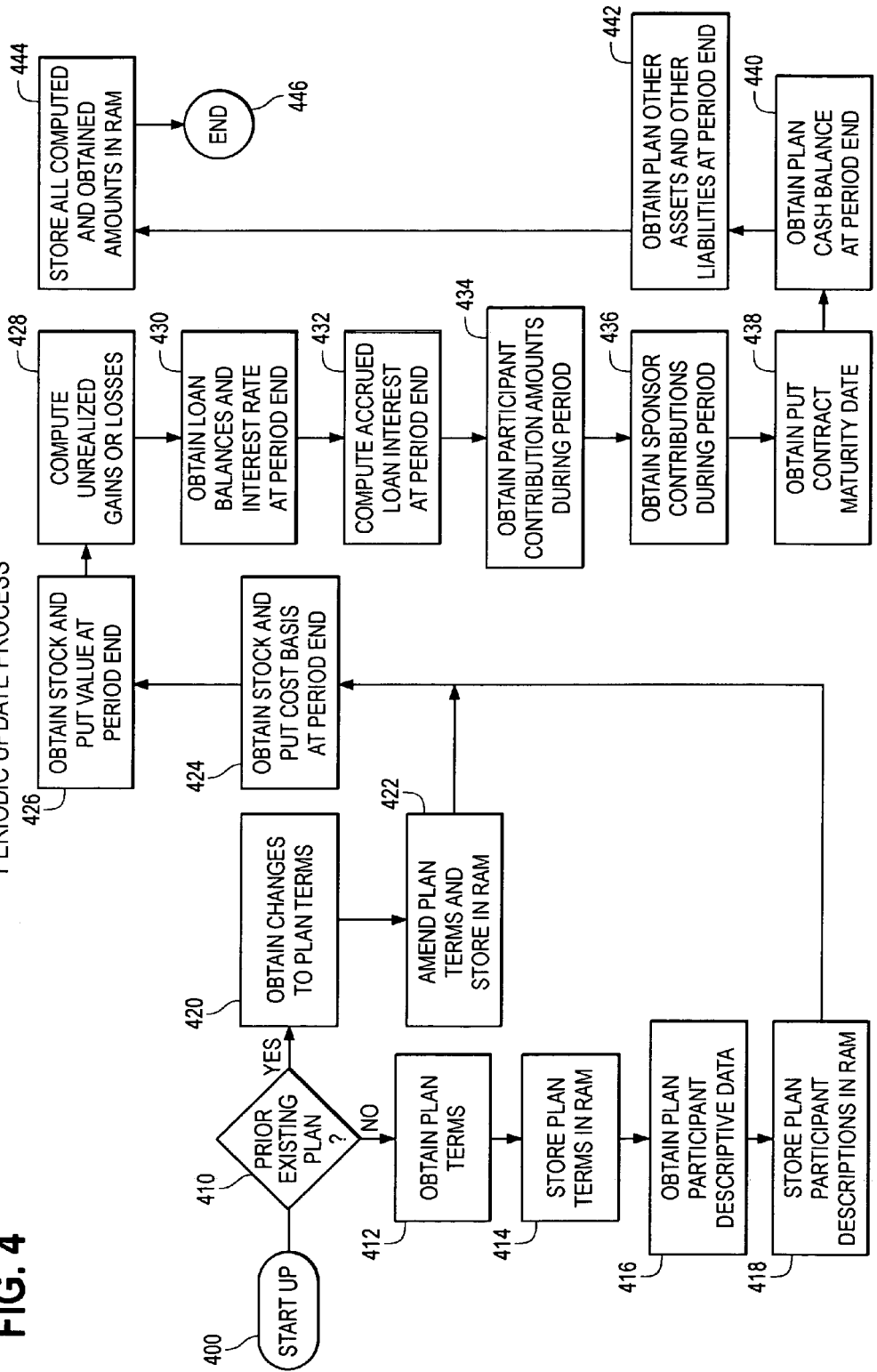
FIG. 4 is a block diagram of the periodic update processes of the present Invention.

FIG. 4 is a block diagram of the periodic update process 4 portion of computer system 100. The steps in the system are designed to capture relevant benefit plan data and event data for each participant and timely record the information in memory 2.

Figure 5A:
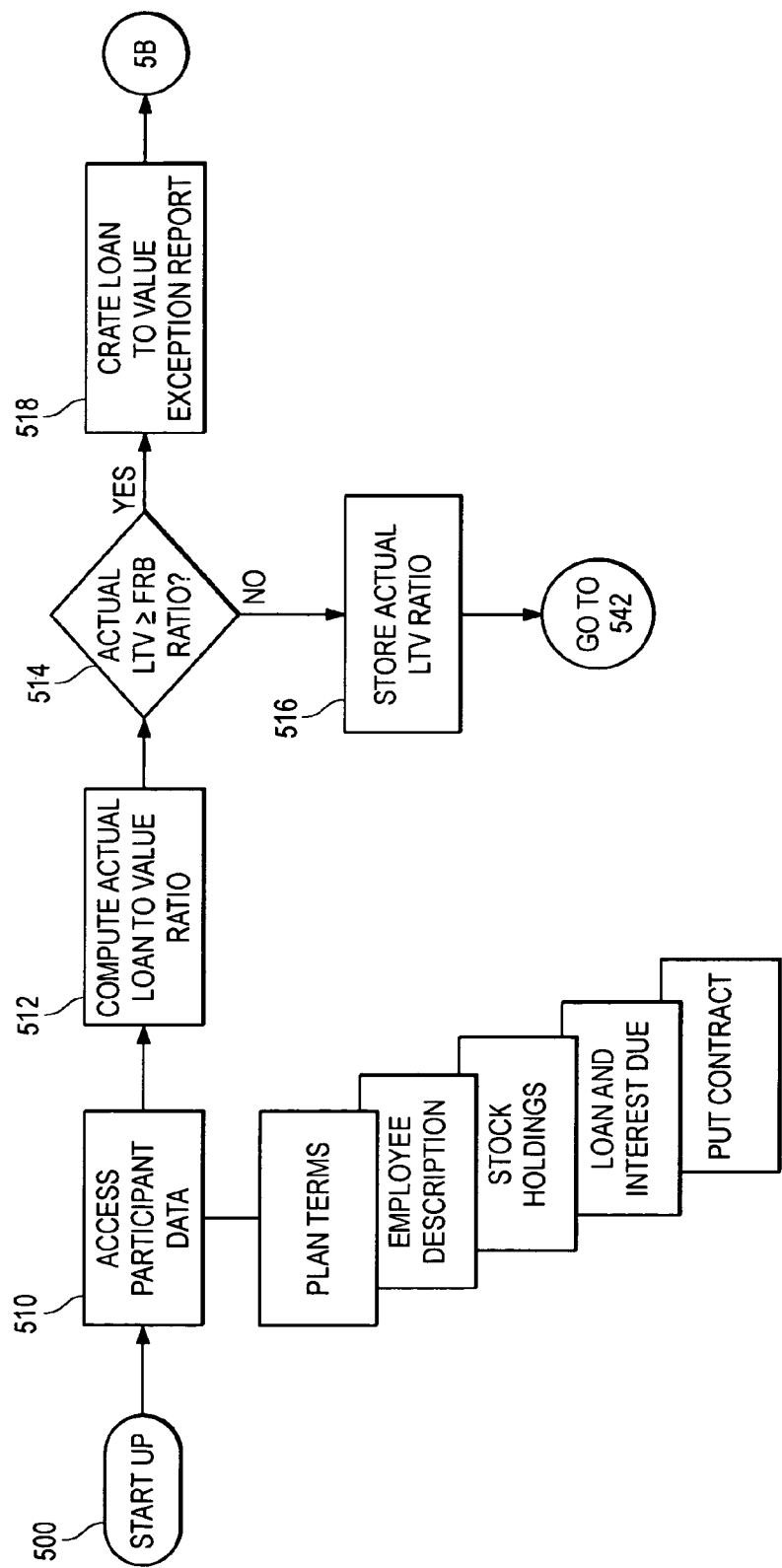
FIG. 5A is a block diagram of the periodic loan monitoring process of the present Invention.
Figure 5B:
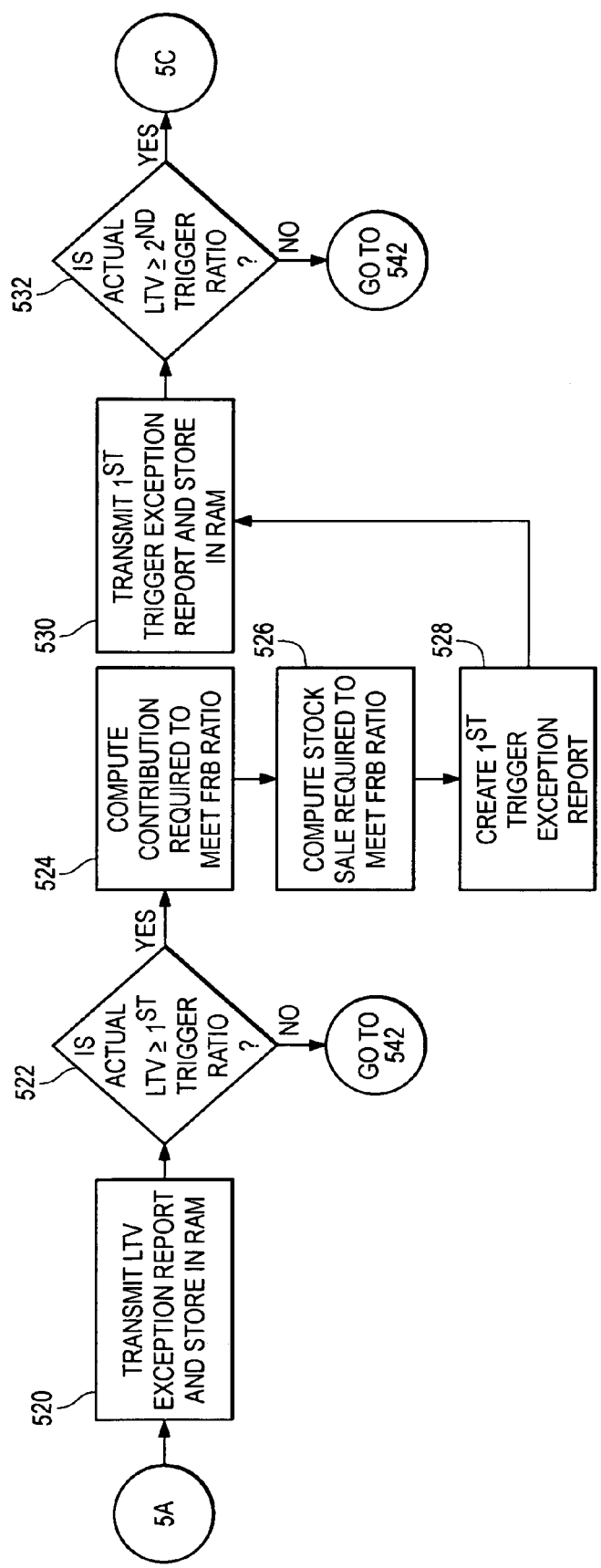
FIG. 5B is a block diagram of the periodic loan monitoring process of the present Invention.
Figure 5C:
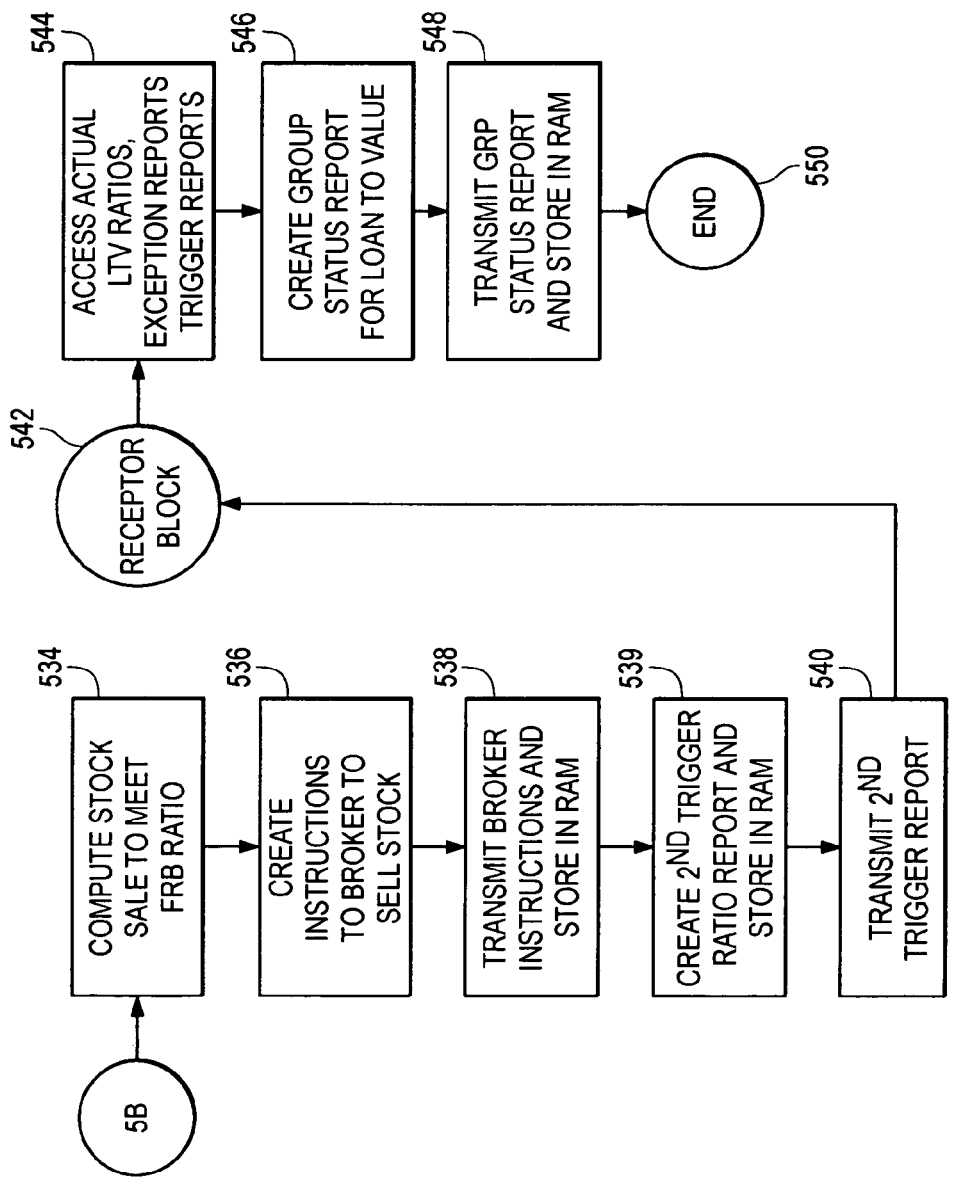
FIG. 5C is a block diagram of the periodic loan monitoring process of the present Invention.
Figure 6A:
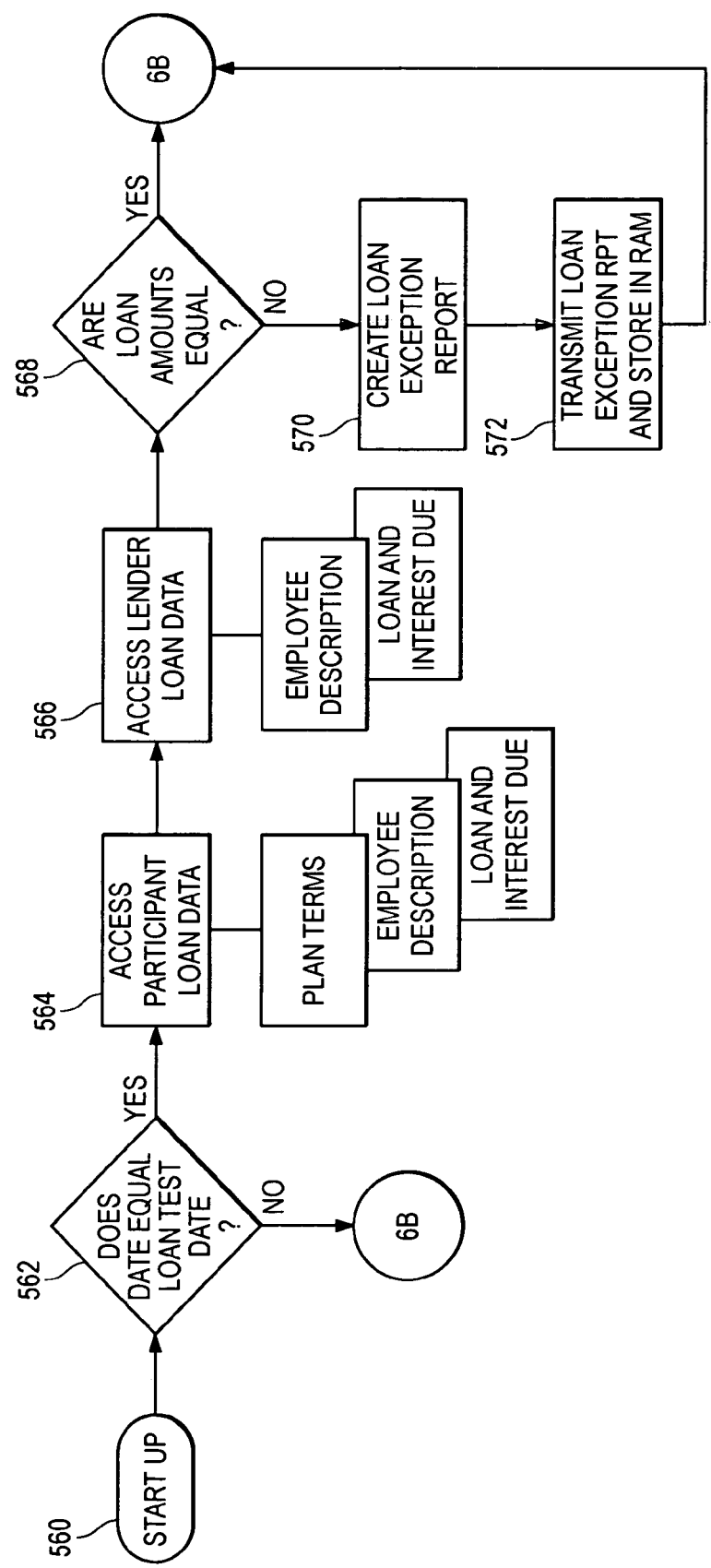
FIG. 6A is a block diagram of the periodic performance tracking and reporting process of the present Invention.
Figure 6B:
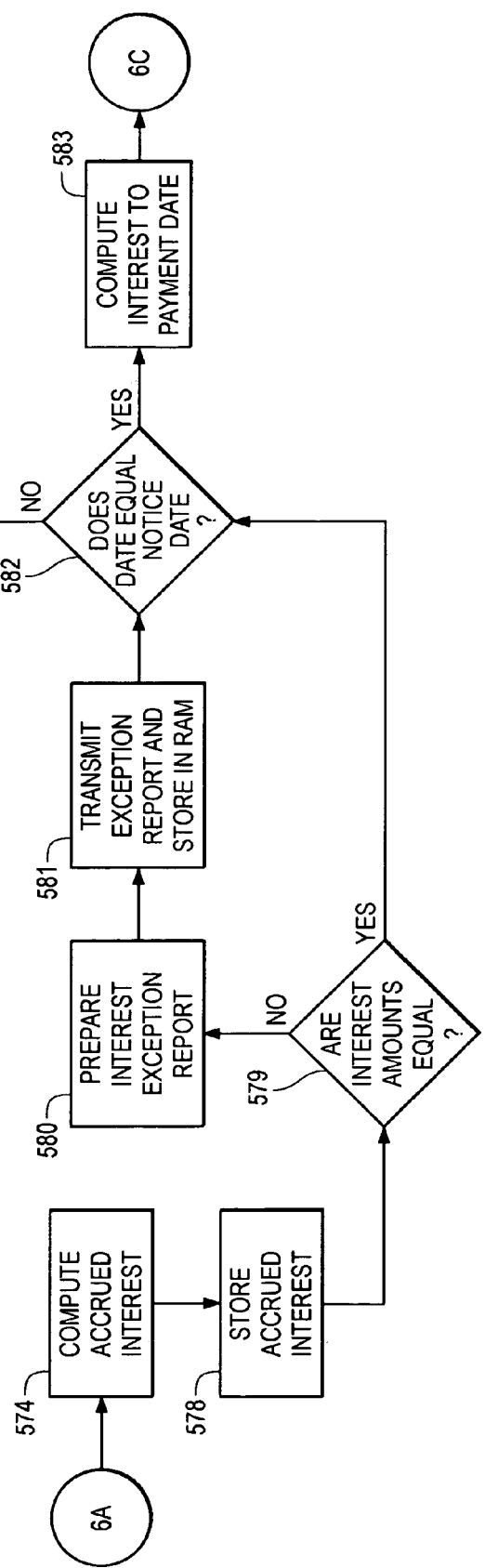
FIG. 6B is a block diagram of the periodic performance tracking and reporting process of the present Invention.
Figure 6C:
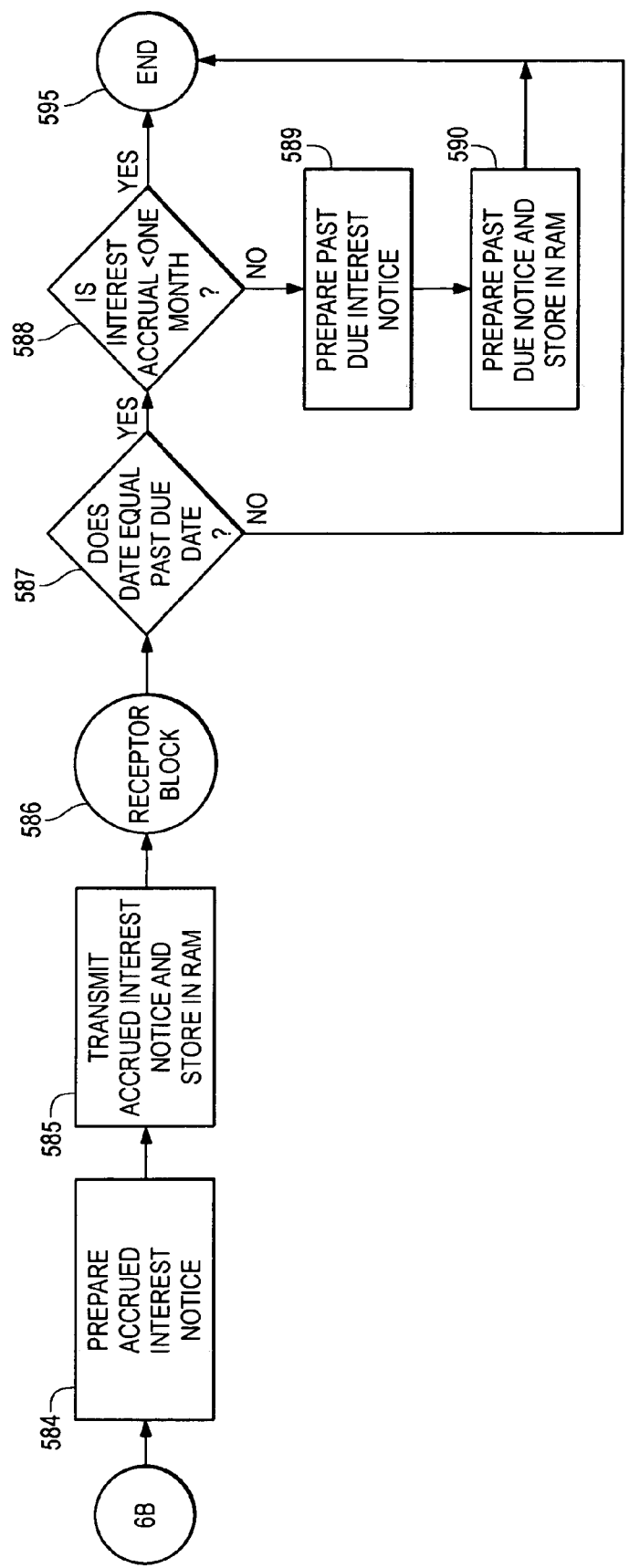
FIG. 6C is a block diagram of the periodic performance tracking and reporting process of the present Invention.
Figure 6D:
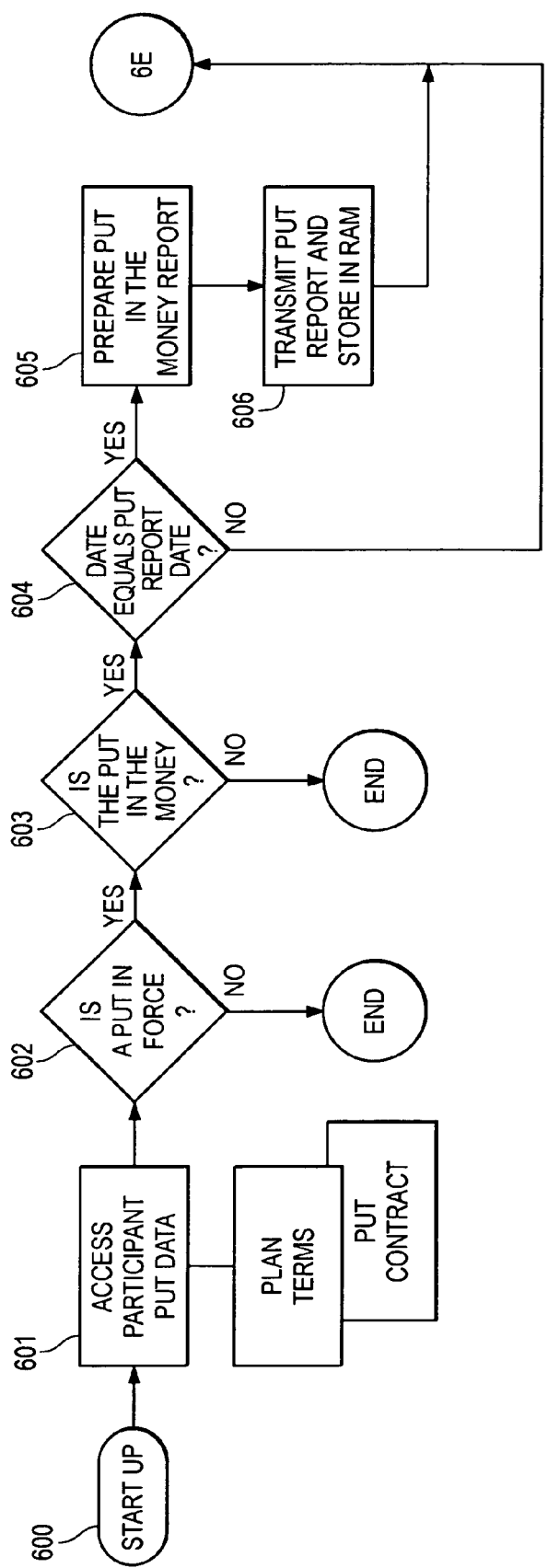
FIG. 6D is a block diagram of the periodic performance tracking and reporting process of the present Invention.
Figure 6E:
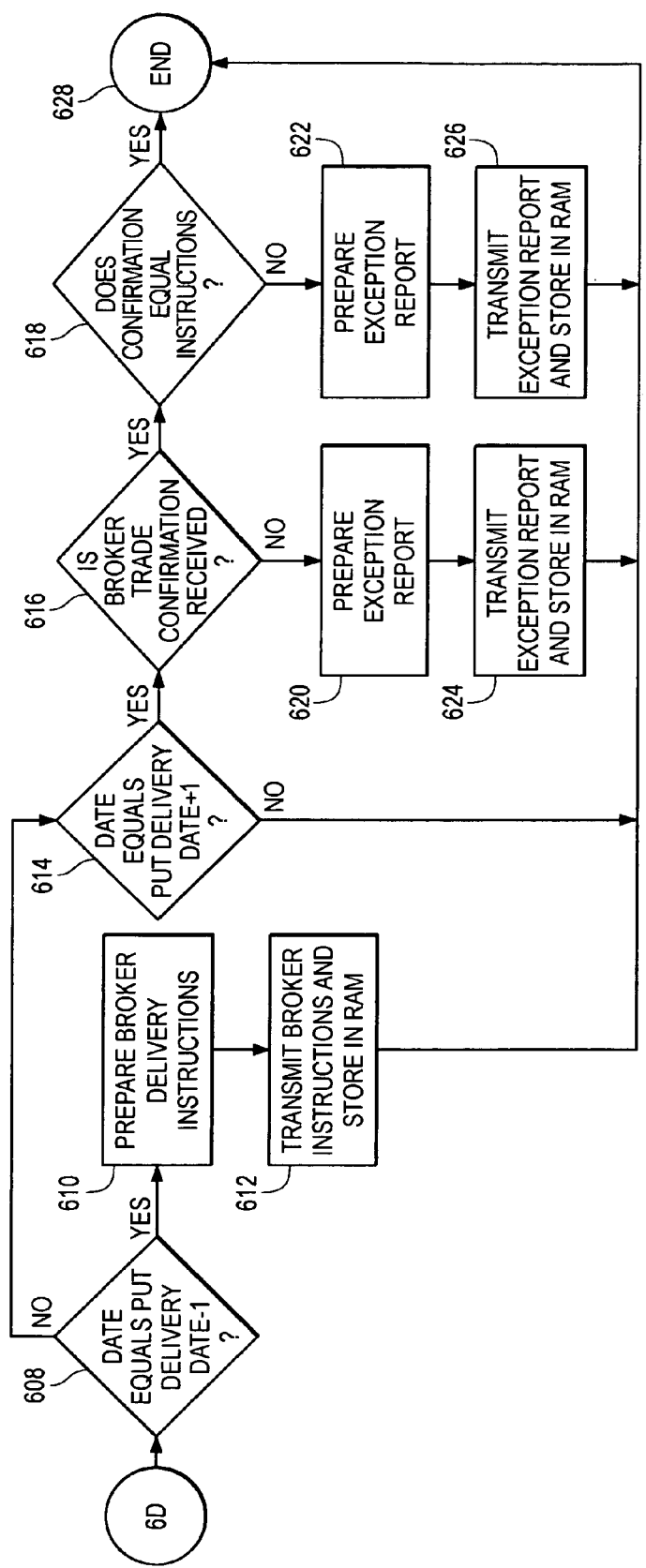
FIG. 6E is a block diagram of the periodic performance tracking and reporting process of the present Invention.
Figure 6F:
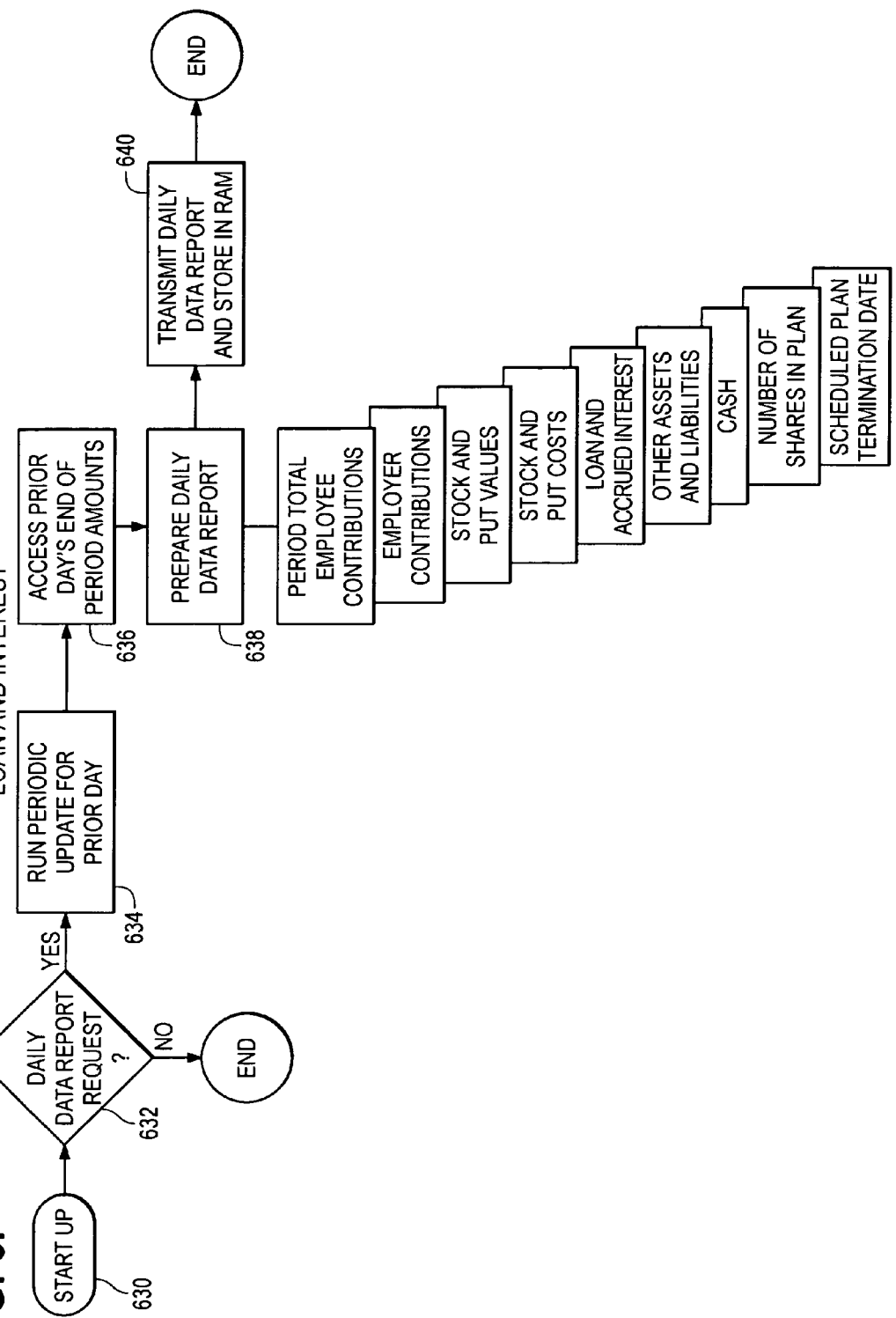
FIG. 6F is a block diagram of the periodic performance tracking and reporting process of the present Invention.
Figure 6H:
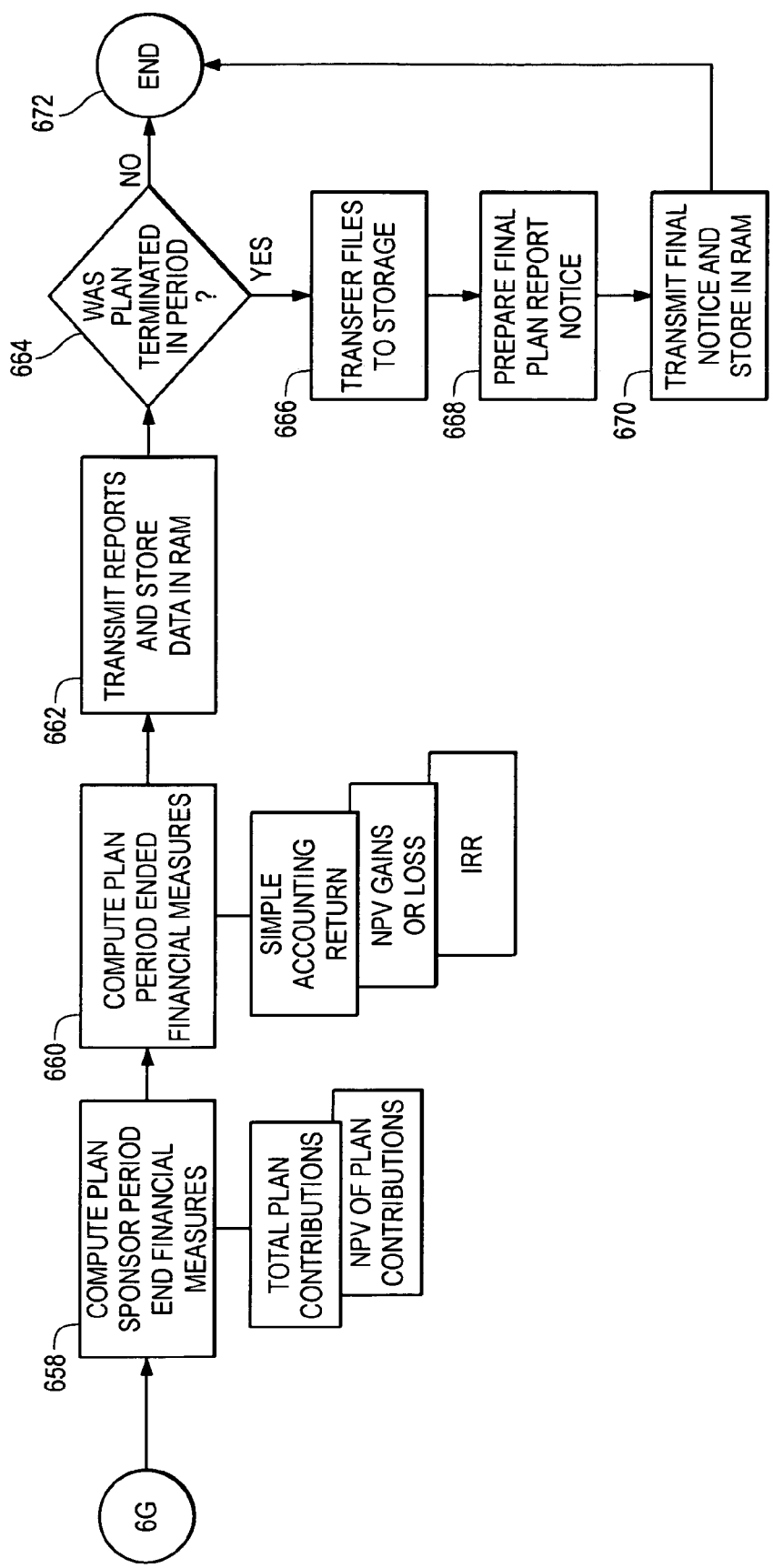
FIG. 6H is a block diagram of the periodic performance tracking and reporting process of the present Invention.
Figure 6I:
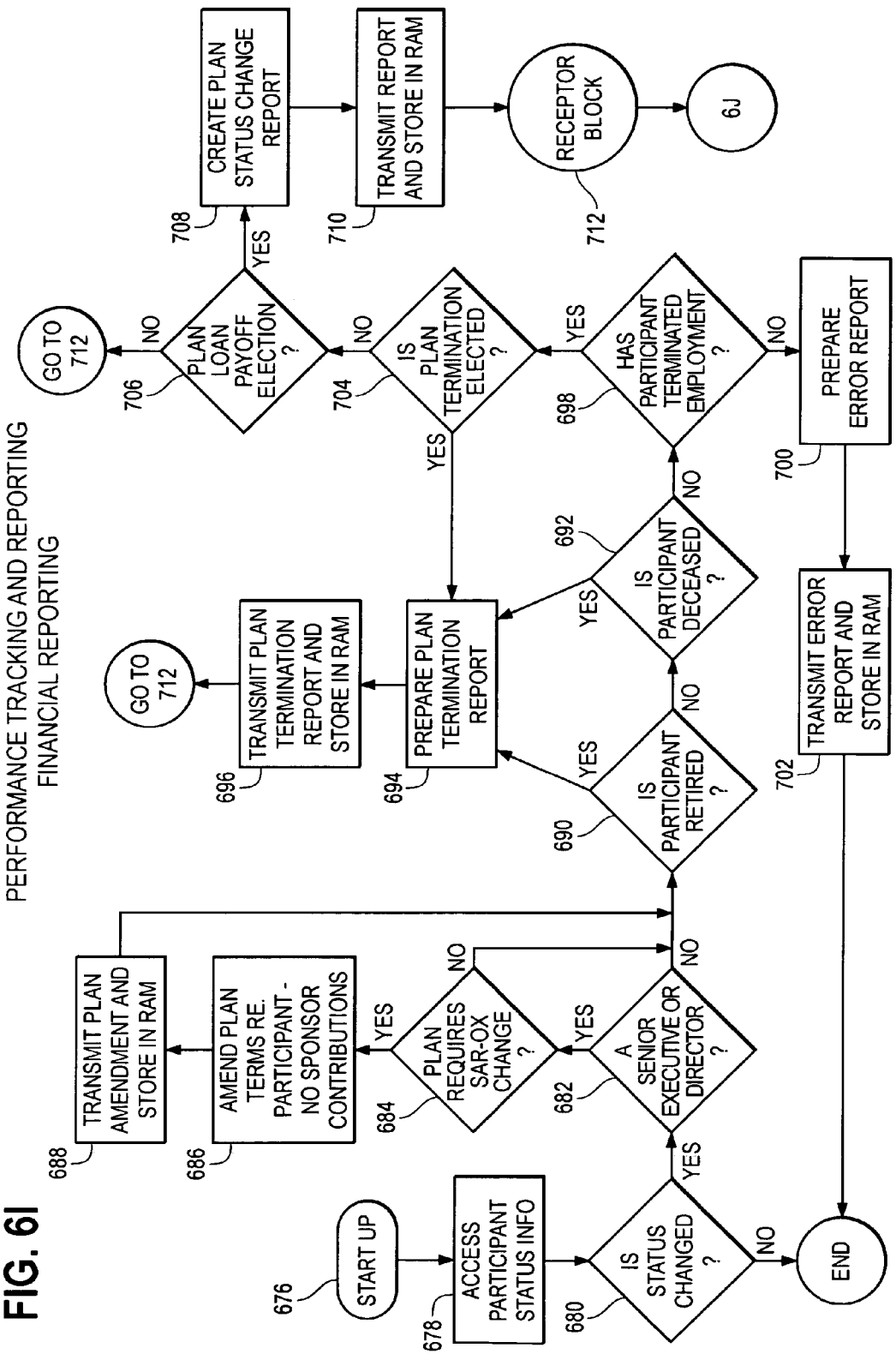
FIG. 6I is a block diagram of the periodic performance tracking and reporting process of the present Invention.
Figure 6J:
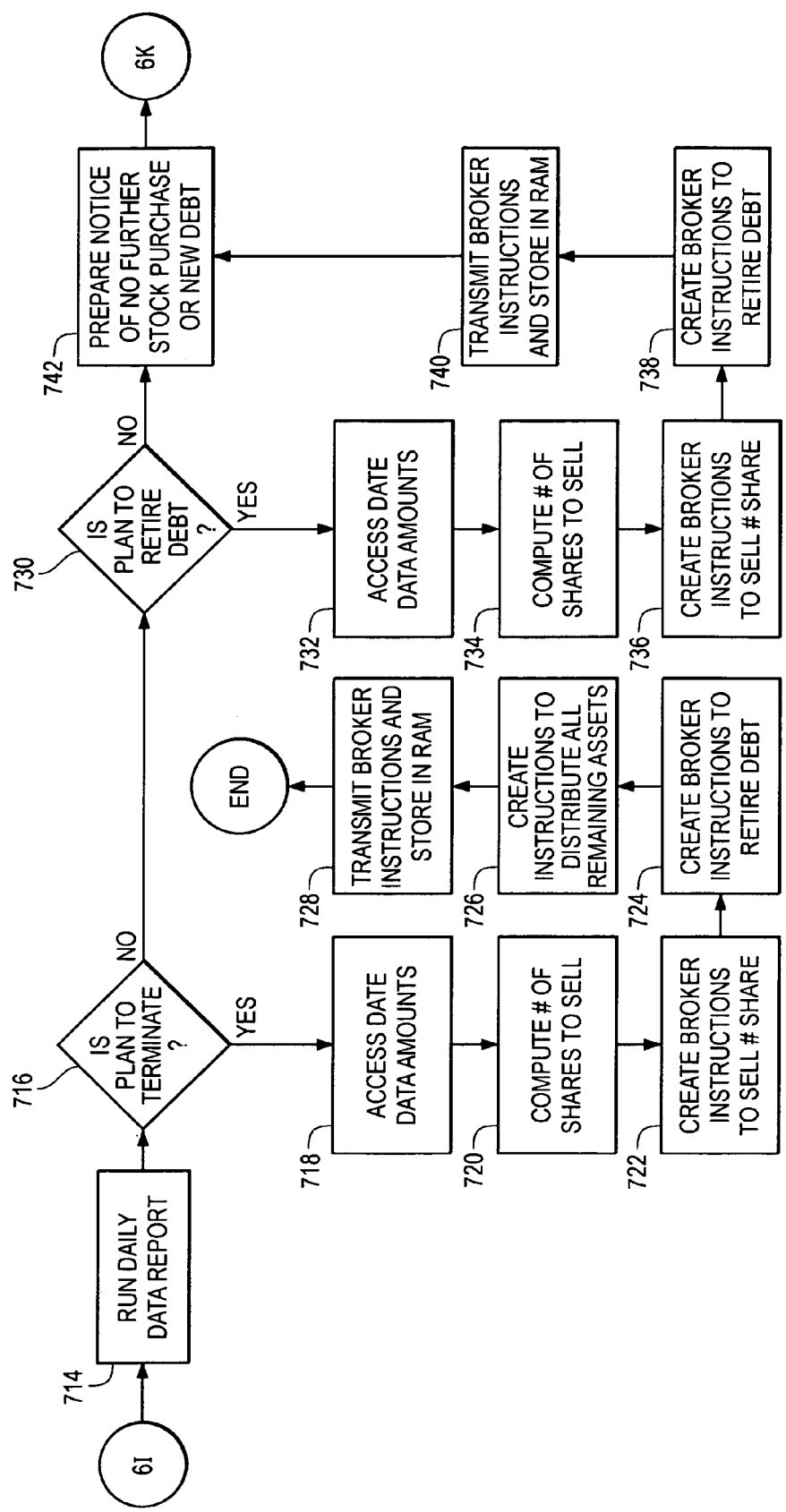
FIG. 6J is a block diagram of the periodic performance tracking and reporting process of the present Invention.
Figure 7A:
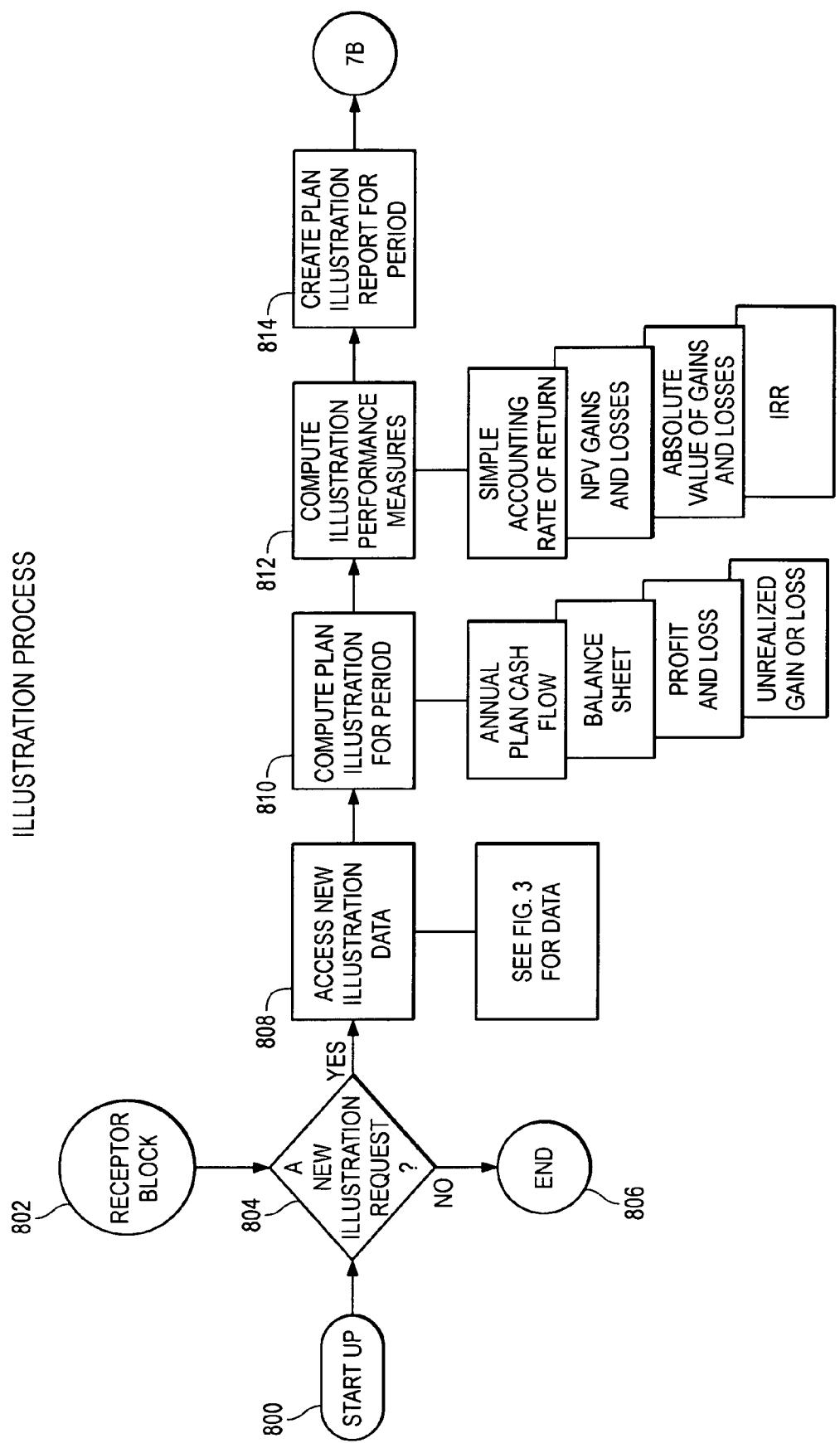
FIG. 7A is a block diagram of the illustration process of the present invention.
Figure 7B:
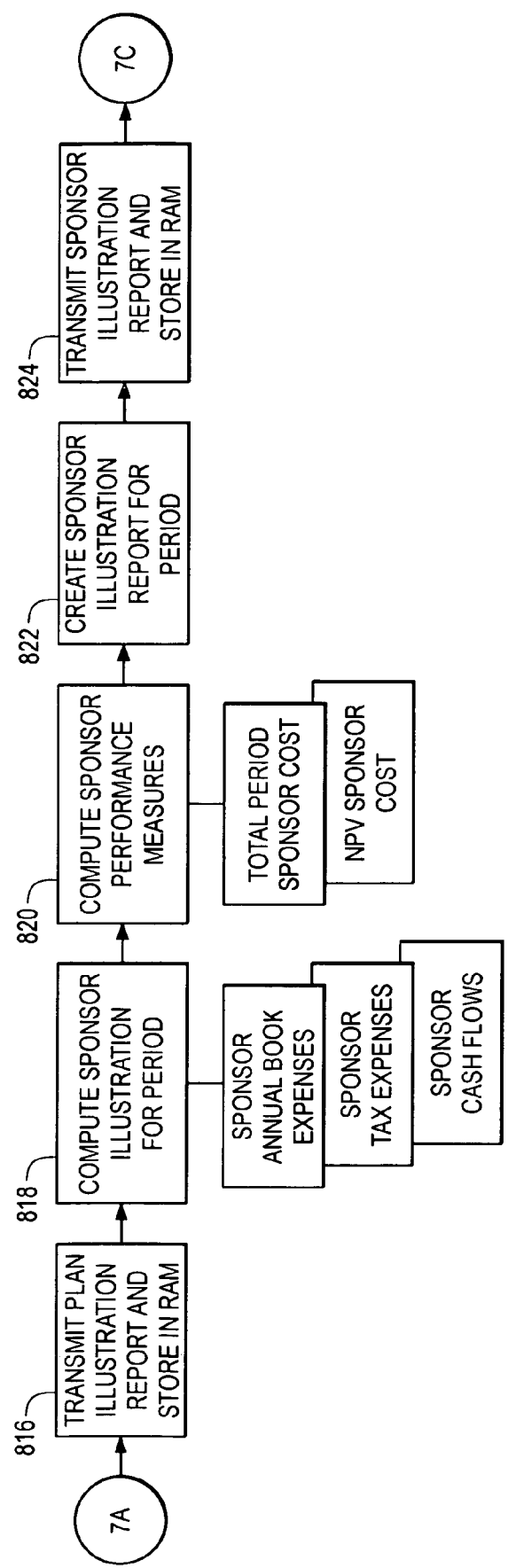
FIG. 7B is a block diagram of the illustration process of the present invention.
Figure 7C:
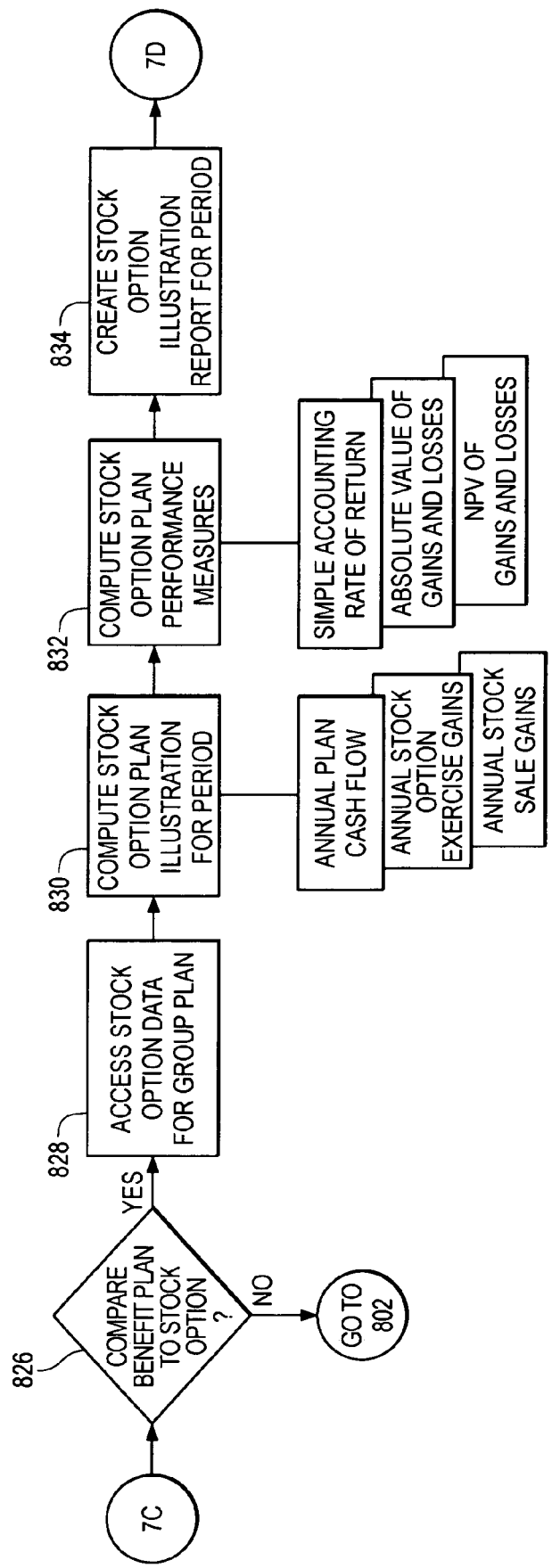
FIG. 7C is a block diagram of the illustration process of the present invention.
Figure 7D:
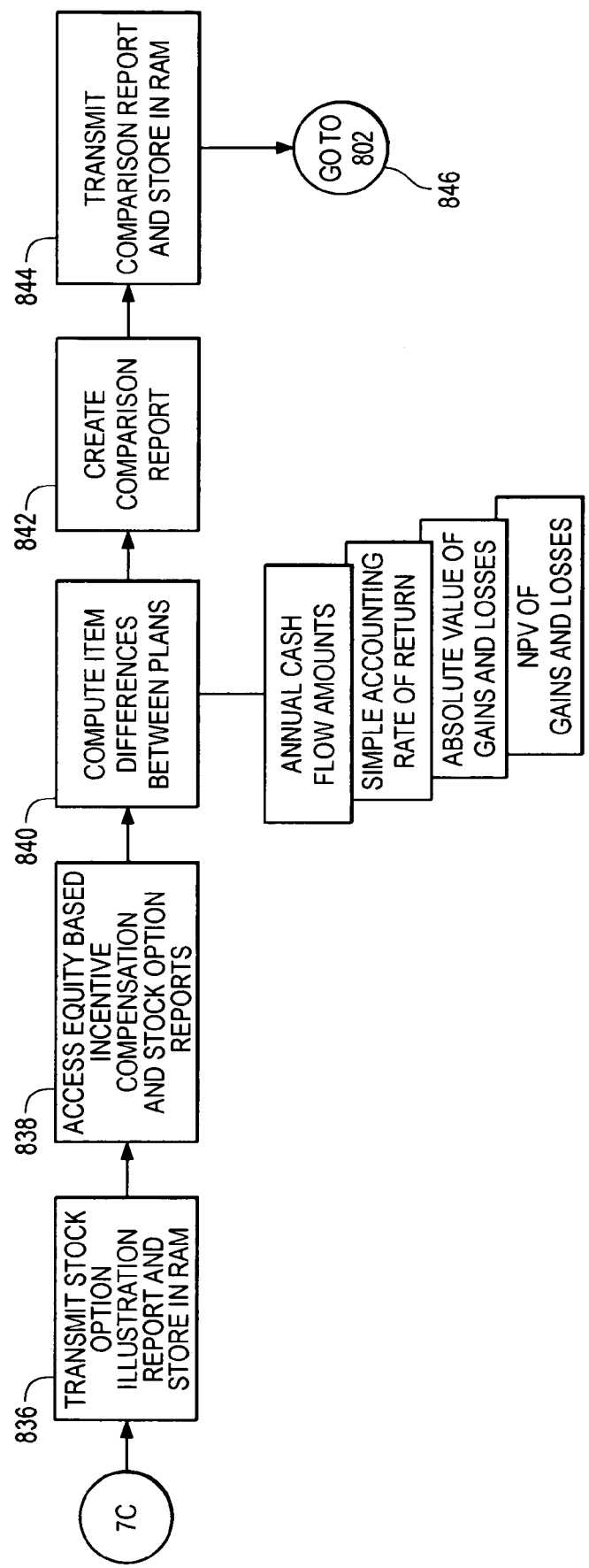
FIG. 7D is a block diagram of the illustration process of the present invention.

FIG. 5 (collectively FIGS. 5A-5C) is a block diagram of the loan monitoring process 5 portion of the computer system 100. The steps in the system are designed to provide timely notices of loss of collateral value to the benefit plan parties of interest—the plan administrator 110, the lender company 112, the plan fiduciary 114, the plan sponsor 116, the plan participant 118 and the brokerage firm 120. Further, the loan monitoring process includes system steps to prevent loans that might violate Reg. U. and system steps to cause an immediate retirement of debt and accrued interest when minimum collateral percentages are breached. This loan monitoring process from block 500 to block 550 is a core element of the invention. This process permits benefit plans to use stock as collateral and not be subject to Reg. T margin calls. Further, the process assures the lender the non-recourse debt will be retired systematically before the stock collateral becomes less than the loan amount.

FIG. 6 (collectively FIGS. 6A-6K) is a block diagram of the performance tracking and reporting process 6. The steps of the system are designed to assure that the benefit plan completes its financial obligations on a timely basis and completes timely financial reporting to the respective benefit plan parties of interest. Timely report data is important for each party to manage its aspect of the benefit plan. The report data is generally required for inclusion in compliance reporting with the Internal Revenue Service, the Federal Reserve Bank, and the Depart of Labor (DOL). (For example, the preparation of grantor income tax returns by the plan administrator 110 and plan fiduciary 114, the electronic preparation of Forms K-1s for plan participants 118, and Federal Reserve Bank reports for the lender company's Federal Reserve Bank Reg U compliance report.) The computer system 100 electronic preparation and delivery of reports assures low administrative costs, making the plan affordable. Further, the dependable exchange and availability of accurate report data assures confidence in the benefit plan.

FIG. 7 (collectively FIGS. 7A-7D) is a block diagram of the illustration process 7. This module of the invention takes assumptions about a hypothetical benefit plan and projects the full range of plan financial performance over a user designated period of years. With computer system 100 projected illustrations, a user may assess participant benefits versus sponsor costs, do sensitivity analysis with respect to different benefit plan variables, prepare cost/benefit analysis regarding the use of puts, and gain a better appreciation of the benefit of a participant paying capital tax versus ordinary income tax on appreciation of stock held in the plan. In addition, the illustration process 7 takes assumptions about a hypothetical non-qualified stock option plan and prepares financial projections of performance similar to those prepared for a benefit plan. Finally the computer system 100 prepares a comparison of periodic cash flows, the group's NPV gains and simple accounting returns as well as the sponsor's total cost, book cost, and NPV of costs.

To summarize, one embodiment of the invention can be viewed as a computer apparatus or system, methods for making and using it, as well as necessary intermediates and products produced thereby. Focusing for the sake of brevity on the computer-implemented method in accordance with the foregoing, there can be a method for monitoring sufficiency of collateral for a loan to a participant's benefit plan. The method can be carried out comprising the steps of: receiving a valuation of collateral for a loan to a benefit plan, the loan at least partially funding acquisition of the collateral held by the benefit plan, the collateral including at least one security of a benefit plan sponsor; determining a balance of the loan to the benefit plan; and comparing the balance of the loan to the valuation of the collateral to monitor sufficiency of the collateral for compliance with a loan requirement permitted under the benefit plan.

In any embodiment, the method can be carried out by further including the step of signaling an incidence of noncompliance with the loan requirement.

In any embodiment, the method can be carried out by further including the step of computing an amount of the collateral to be sold to retire debt to comply with a loan requirement.

In any embodiment, the method can be carried out by further including the step of computing an amount of additional collateral required to comply with the loan requirement.

In any embodiment, the method can be carried out such that the step of comparing includes: computing the actual ratio of the loan amount divided by the value of the collateral; comparing an actual ratio to a test ratio; and signaling when the actual ratio equals or exceeds the test ratio.

In any embodiment, the method can be carried out such that the step of receiving a valuation of collateral is carried out with said at least one security including at least one equity security, a put contract for an equity security.

In any embodiment, the method can be carried out such that the step of comparing the balance of the loan to the valuation of the collateral to monitor sufficiency of the collateral for compliance with a loan requirement permitted under the benefit plan is carried out with the benefit plan being an ERISA benefit plan.

In an aspect of an embodiment of the invention, there can be a computer-implemented method for illustrating a participant's benefit plan financial performance. The method can include the steps of: receiving benefit plan data, the data including a valuation of collateral for a loan to the benefit plan, the loan related to the benefit play by said loan at least partially funding acquisition of the collateral held by the benefit plan, the collateral including at least one security of a benefit plan sponsor, the loan having a balance sufficient for compliance with a loan requirement permitted under the benefit plan; and generating an illustration of said participant's benefit plan financial performance over time.

In any embodiment, the method can be carried out such that the step of generating an illustration includes at least one or more of the following sub-steps: computing a simple accounting rate for return said participant's benefit plan; computing the plan's internal rate of return; computing the plan's present value gain or loss; computing the plan sponsor's GAAP cost; and computing the plan sponsor's present value cost.

In any embodiment, the method can be carried out including the step of transferring at least one financial performance item to at least one party with an interest in the benefit plan.

Considering another aspect of the invention, there can be a computer-implemented method of illustrating a comparison of at least one participant in a stock option plan to at least one participant in a participant's benefit plan. This method can include the steps of receiving financial performance data for a participant's benefit plan, the benefit plan having collateral for a loan to the benefit plan, the loan at least partially funding acquisition of the collateral held by the benefit plan, the collateral including at least one security of a plan benefit sponsor; receiving the financial performance data for a stock option plan; generating a comparison of the stock option plan and the benefit plan data; and computing at least one difference between said stock option plan and said benefit plan.

In any embodiment, the method can be carried out such that at least one of the steps is carried out with the benefit plan being an ERISA benefit plan, or in another embodiment, the benefit plan can be a non-ERISA benefit plan.

While a particular embodiment of the present invention has been disclosed, it is to be understood that various different modifications are possible and are within the true spirit of the invention. Accordingly, other computerized aspects of business processes can be modified in accordance with the present invention. The scope of the present invention is to be determined with reference to the claims set forth below, and there is no intention to limit the invention to the exact disclosure presented herein as a teaching of one embodiment of the invention.

I claim:

1. A method of using an apparatus to monitor sufficiency of collateral for a loan to a non-tax qualified benefit plan, the method comprising:

providing a computer system including a processor connected to an input device so as to receive input data and to an output device so as to communicate output data, the processor programmed to monitor sufficiency of collateral in a transaction in which a loan to a non-tax-qualified benefit plan at least partially funds acquisition of the collateral held by the benefit plan, the collateral including at least one security issued by a sponsor of the benefit plan;

receiving, as some of the input data, a value of the collateral for the loan to the non-tax qualified benefit plan;

receiving, as some of the input data, a balance of the loan to the value of the collateral; and producing, with the processor, a report comparing the balance of the loan to the value of the collateral to monitor sufficiency of the collateral for compliance with a Regulation U loan requirement in effect on Apr. 1, 2004, in producing a report; and outputting the report at the output device.

2. The method of claim 1, further including signaling an incidence of noncompliance with the loan requirement.

3. The method of claim 2, further including the step of computing an amount of the collateral to be sold to retire debt to comply with the loan requirement.

4. The method of claim 2, further including the step of computing an amount of additional collateral required to comply with the loan requirement.

5. The method of claim 1, wherein the step of comparing includes:

computing an actual ratio of the loan amount divided by the value of the collateral; and comparing the actual ratio to a test ratio to determine whether to signal noncompliance with the loan requirement.

6. The method of any one of claims 1-5, wherein the receiving a value of the collateral is carried out with said at least one security including at least one equity security, a put contract for an equity security, or a call contract for an equity security.

7. The method of claim 6, wherein a put contract, held by a lender that provides the loan, accounts for a portion of the collateral held by the benefit plan or a reduction of the loan due to the lender from the benefit plan.

8. The method of claim 6, wherein the receiving a value of the collateral is carried out with said at least one security including at least one of said equity security or said put contract for the equity security.

9. The method of claim 8, wherein the receiving a value of the collateral is carried out with said at least one security including at least one said equity security.

10. The method of any one of claims 1-5, wherein comparing the balance of the loan to the value of the collateral to monitor sufficiency of the collateral is carried out with the benefit plan being subject to ERISA rules in effect on Apr. 1, 2004.

11. The method of claim 10, wherein a put contract, held by a lender that provides the loan, accounts for a portion of the collateral held by the benefit plan or a reduction of the loan due to the lender from the benefit plan.

12. The method of claim 6, wherein the comparing the balance of the loan to the value of the collateral to monitor sufficiency of the collateral is carried out with the benefit plan being subject to ERISA rules in effect on Apr. 1, 2004.

13. The method of claim 8, wherein the comparing the balance of the loan to the value of the collateral to monitor sufficiency of the collateral is carried out with the benefit plan being subject to ERISA rules in effect on Apr. 1, 2004.

14. The method of claim 9, wherein the comparing the balance of the loan to the value of the collateral to monitor sufficiency of the collateral is carried out with the benefit plan being subject to ERISA rules in effect on Apr. 1, 2004.

15. The method of any one of claims 1-5, wherein the comparing the balance of the loan to the value of the collateral to monitor sufficiency of the collateral is carried out with the benefit plan not being subject to ERISA rules in effect on Apr. 1, 2004.

16. A method of using an apparatus to illustrate a non-tax-qualified benefit plan's financial performance, the method including:
providing a computer system including a processor connected to an input device so as to receive input data and to an output device so as to communicate output data, the processor programmed to monitor sufficiency of collateral in a transaction in which a loan to a non-tax-qualified benefit plan at least partially funds acquisition of the collateral held by the benefit plan, the collateral including at least one security issued by a sponsor of the benefit plan;
receiving, as some of the input data, non-tax-qualified benefit plan data, the data including a value of the collateral for the loan to the non-tax-qualified benefit plan, the loan having a balance sufficient for compliance with a Regulation U loan requirement in effect on Apr. 1, 2004;
receiving plan sponsor, benefit plan, beneficiary cash flow, and accounting estimated data, as additional input data;
generating, with the processor from the additional input data, an illustration of said benefit plan's financial performance; and
outputting the illustration as the output data.

17. The method of claim 16, wherein the generating an illustration includes at least one of the following steps:
computing a simple accounting rate of return of the benefit plan;
computing the benefit plan's internal rate of return;
computing the benefit plan's present value gain or loss;
computing the benefit plan sponsor's GAAP cost;
computing the benefit plan sponsor's present value cost;
computing a simple accounting rate of return of at least one participant's interest in the benefit plan;
computing an internal rate of return of at least one participant's interest in the benefit plan; and
computing a present value gain or loss of at least one participant's interest in the benefit plan.

18. The method of claim 17, wherein the generating an illustration includes at least one additional said step.

19. The method of claim 18, wherein the generating an illustration includes at least one additional said step.

20. The method of claim 19, wherein the generating an illustration includes at least one additional said step.

21. The method of claim 20, wherein the generating an illustration includes at least one additional said step.

22. The method of any one of claims 16-21, further including electronically communicating the illustration to another computer.

23. A method of using an apparatus to compare a stock option plan to a non-tax qualified benefit plan, the method including:
providing a computer system including a processor connected to an input device so as to receive input data and to an output device so as to communicate output data, the processor programmed to monitor sufficiency of collateral in a transaction in which a loan to a non-tax-qualified benefit plan at least partially funds acquisition of the collateral held by the benefit plan, the collateral including at least one security issued by a sponsor of the benefit plan;
receiving, as some of the input data, financial performance data for the non-tax qualified benefit plan;
receiving, as some of the input data, the financial performance data for a stock option plan;
generating, with the processor, a comparison of the stock option plan and the benefit plan data;
computing, with the processor, at least one difference between the stock option plan and the benefit plan; and
producing the at least one difference as the output.

24. The method of claim 23, further including:
electronically communicating the difference to another computer.

25. The method of any one of claims 1-5, 16-21, 23, 24, wherein a put contract, held by a lender that provides the loan, accounts for a portion of the collateral held by the benefit plan or a reduction of the loan due to the lender from the benefit plan.

26. The method of any one of claims 16-24, wherein the benefit plan is subject to ERISA rules in effect on Apr. 1, 2004.

27. An apparatus comprising:
a digital computer processor connected to an input device for receiving input information and to an output device, the computer processor programmed to carry out:
receiving, as some of the input information, a value of the collateral for the loan to the non-tax qualified benefit plan, the loan at least partially funding acquisition of the collateral held by the benefit plan, the collateral including at least one security of a sponsor of the benefit plan;
comparing, with the processor, the balance of the loan to the value of the collateral to monitor sufficiency of the collateral for compliance with a Regulation U loan requirement in effect on Apr. 1, 2004 in producing an analysis, and
facilitating communication of the analysis to the output device.

28. The apparatus of claim 27, wherein the computer processor is programmed to carry out signaling an incidence of noncompliance with the loan requirement.

29. The apparatus of claim 28, wherein the computer processor is programmed to carry out the computing an amount of the collateral to be sold to retire debt to comply with the loan requirement.

30. The apparatus of claim 28, wherein the computer processor is programmed to carry out the computing an amount of additional collateral required to comply with the loan requirement.

31. The apparatus of claim 27, wherein the computer processor is programmed to carry out the comparing by:

computing an actual ratio of the loan amount divided by the value of the collateral; and comparing the actual ratio to a test ratio to determine whether to signal noncompliance with the loan requirement.

32. The apparatus of any one of claims 27-31, wherein the at least one security includes at least one equity security, a put contract for an equity security, or a call contract for an equity security.

33. The apparatus of claim 32, further including a put contract, held by a lender of the loan, that accounts for a portion of the collateral held by the benefit plan or a reduction of the loan due to the lender from the benefit plan.

34. The apparatus of claim 32, further including a put contract, held by a lender of the loan, that accounts for a portion of the collateral held by the benefit plan or a reduction of the loan due to the lender from the benefit plan.

35. The apparatus of claim 32, wherein the at least one security includes at least one of said equity security or said put contract for the equity security.

36. The apparatus of claim 35, wherein the at least one security includes at least one said equity security.

37. The apparatus of any one of claims 27-31, wherein the benefit plan is subject to ERISA rules in effect on Apr. 1, 2004.

38. The apparatus of claim 32, wherein the benefit plan is subject to ERISA rules in effect on Apr. 1, 2004.

39. The apparatus of claim 35, wherein the benefit plan is subject to ERISA rules in effect on Apr. 1, 2004.

40. The apparatus of claim 36, wherein the benefit plan is subject to ERISA rules in effect on Apr. 1, 2004.

41. An apparatus including:
a digital computer processor connected to an input device for receiving input information and to an output device, the computer processor programmed to carry out:
receiving, as some of the input information, benefit plan data of a non-tax qualified benefit plan, the data including a valuation of collateral for a loan to the benefit plan, the loan related to the benefit plan by said loan at least partially funding acquisition of the collateral held by the benefit plan, the collateral including at least one security of a sponsor of the benefit plan, the loan having a balance sufficient for compliance with a Regulation U loan requirement in effect on Apr. 1, 2004,
receiving plan sponsor, benefit plan, beneficiary cash flow, and accounting estimated data, as additional input data;
generating, from the additional input data, an illustration of the benefit plan's financial performance, and
facilitating communicating the illustration to the output device.

42. The apparatus of claim 41, wherein generating an illustration includes at least one of the following steps:

computing a simple accounting rate of return of the benefit plan;
computing the benefit plan's internal rate of return;
computing the benefit plan's present value gain or loss;
computing the benefit plan sponsor's GAAP cost;
computing the benefit plan sponsor's present value cost;
computing a simple accounting rate of return of at least one participant's interest in the benefit plan;
computing an internal rate of return of at least one participant's interest in the benefit plan; and
computing a present value gain or loss of at least one participant's interest in the benefit plan.

43. The apparatus of claim 42, wherein the generating an illustration includes at least one additional said step.

44. The apparatus of claim 43, wherein the generating an illustration includes at least one additional said step.

45. The apparatus of claim 44, wherein generating an illustration includes at least one additional said step.

46. The apparatus of claim 45, wherein the generating an illustration includes at least one additional said step.

47. The apparatus of any one of claims 41-46, further including an other computer system receiving the illustration.

48. An apparatus including:
a digital computer processor connected to an input device for receiving input information and to an output device, the computer processor programmed to carry out:
receiving, as some of the input information, financial performance data for a benefit plan, the benefit plan having collateral for a loan to the benefit plan, the loan at least partially funding acquisition of the collateral held by the benefit plan, the collateral including at least one security of a sponsor of the benefit plan;
receiving, as some of the input information, the financial performance data for a stock option plan;
generating, with the processor, a comparison of the stock option plan and the benefit plan data;
computing, with the processor, at least one difference between the stock option plan and the benefit plan; and
facilitating communication of the at least one difference to the output device.

49. The apparatus of claim 48, further including an other computer apparatus receiving the at least one difference.

50. The apparatus of any one of claims 27-31, 41-46, 48, 49, further including a put contract, held by a lender of the loan, that accounts for a portion of the collateral held by the benefit plan or a reduction of the loan due to the lender from the benefit plan.

51. The apparatus of any one of claims 48-49, wherein said computer is programmed to carry out with the benefit plan being subject to ERISA rules in effect on Apr. 1, 2004.

* * * * *